(12) United States Patent
Wensink et al.

(10) Patent No.: US 6,807,523 B1
(45) Date of Patent: Oct. 19, 2004

(54) METHOD AND APPARATUS FOR EMULATING THE OPTICAL BEHAVIOR OF OPTICAL COMMUNICATION SYSTEMS

(75) Inventors: James B. Wensink, Marietta, GA (US); James C. Gaskin, Eldersburg, MD (US); Michael B. Peters-Rodbell, Dayton, MD (US)

(73) Assignee: Ciena Corporation, Linthicum, MD (US)

(*) Notice: Subject to any disclaimer, the term of this patent is extended or adjusted under 35 U.S.C. 154(b) by 203 days.

(21) Appl. No.: 10/003,074

(22) Filed: Oct. 31, 2001

(51) Int. Cl.[7] .............................................. G06F 9/455
(52) U.S. Cl. ........................... 703/27; 703/14; 359/110; 359/130
(58) Field of Search .............................. 703/14, 22, 23, 703/24, 27, 16; 709/223, 224; 359/110, 118, 124, 130; 370/386, 404

(56) References Cited

U.S. PATENT DOCUMENTS

| | | | | |
|---|---|---|---|---|
| 5,047,969 A | * | 9/1991 | Sloane | 364/578 |
| 5,063,559 A | * | 11/1991 | Marcuse | 359/127 |
| 5,905,715 A | * | 5/1999 | Azarmi et al. | 370/244 |
| 5,978,115 A | * | 11/1999 | Condict et al. | 359/124 |
| 6,052,722 A | * | 4/2000 | Taghadoss | 709/223 |
| 6,163,392 A | * | 12/2000 | Condict et al. | 359/124 |
| 6,199,032 B1 | * | 3/2001 | Anderson | 703/21 |
| 6,304,347 B1 | * | 10/2001 | Beine et al. | 359/110 |
| 6,510,257 B1 | * | 1/2003 | Barwicz et al. | 385/11 |

OTHER PUBLICATIONS

Maltz et al., US patent application No. US 2002/0141351 A1.*
Zhou et al., US patent application No. US 2003/0016411 A1.*

* cited by examiner

*Primary Examiner*—Thai Phan
(74) *Attorney, Agent, or Firm*—Michael R. Cammarata

(57) ABSTRACT

A method and system for emulating the optical behavior of an optical communications generates wavelength modeled objects for each emulated optical signal and a variety of other modeled objects for the optical communications modules of the emulated system such as transmitter modeled objects, a combiner modeled object, an amplifier modeled object, a splitter modeled object, and receiver modeled objects. Each of the modeled objects includes certain optical attributes and a behavior modeling function particular to the module being emulated. The optical modules themselves are also represented as emulated processes. The modeled objects are propagated along a logical path from emulated process to emulated process. Upon receipt of a modeled object the emulated process executes the behavior modeling function and updates modeling objects affected by the execution. The propagation of modeled objects and execution of behavior modeling functions in this fashion results in a cascade of optical property changes across the emulated system.

23 Claims, 17 Drawing Sheets

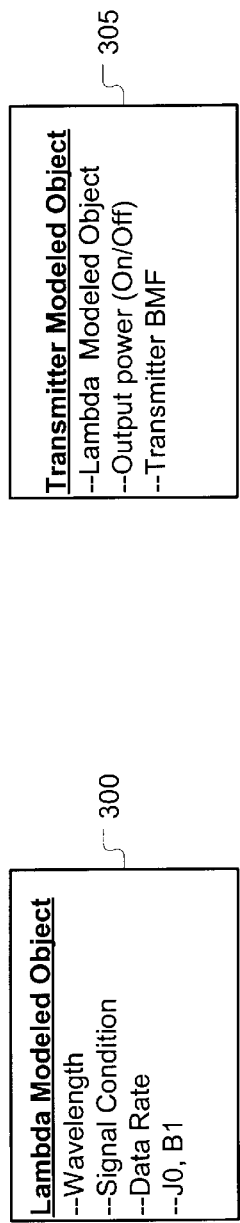
Lambda Modeled Object
--Wavelength
--Signal Condition
--Data Rate
--J0, B1
Figure 7a
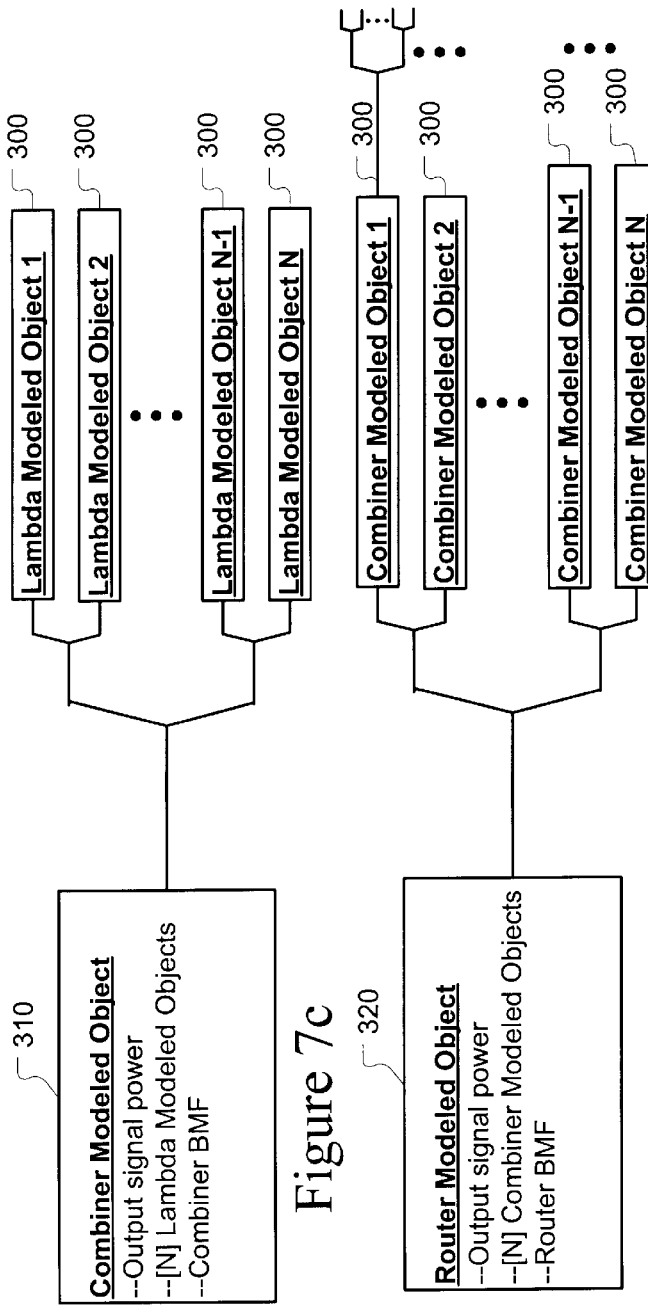
Transmitter Modeled Object
--Lambda Modeled Object
--Output power (On/Off)
--Transmitter BMF
Figure 7b
Combiner Modeled Object
--Output signal power
--[N] Lambda Modeled Objects
--Combiner BMF
Figure 7c
Router Modeled Object
--Output signal power
--[N] Combiner Modeled Objects
--Router BMF
Figure 7d

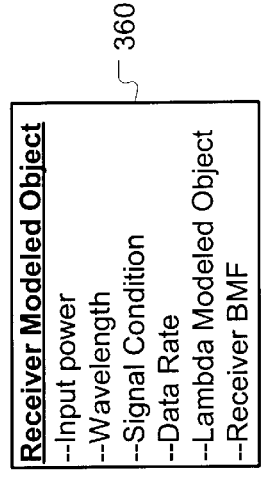
Figure 7e
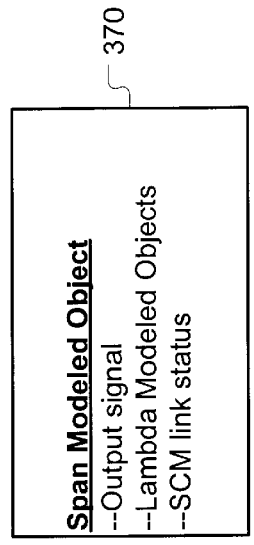
Figure 7f
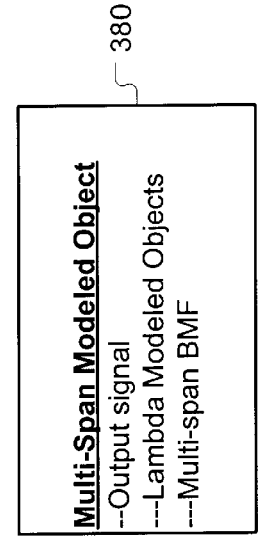
Figure 7g
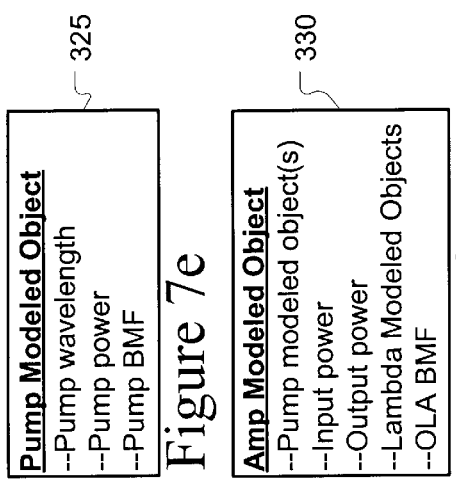
Figure 7i
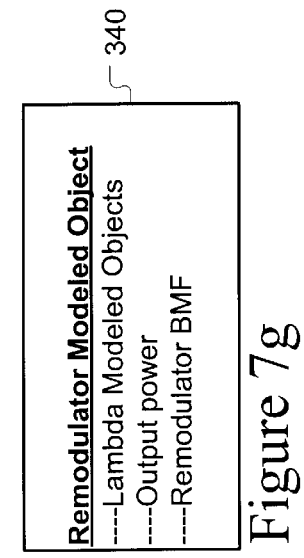
Figure 7j
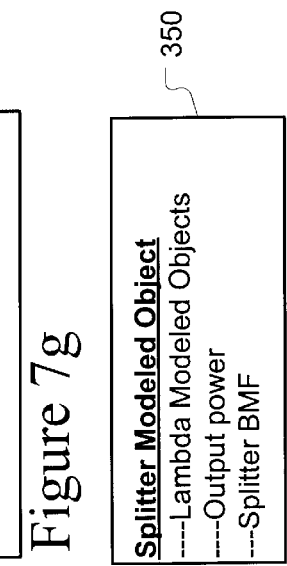
Figure 7k
Figure 7h

METHOD AND APPARATUS FOR EMULATING THE OPTICAL BEHAVIOR OF OPTICAL COMMUNICATION SYSTEMS

CROSS REFERENCE TO RELATED APPLICATIONS

This application is related to U.S. Pat. No. 5,978,115 entitled "Span Management System For Wavelength Division Multiplexed Network" to Condict et al. (hereinafter, "Condict '115"), filed May 27, 1998, the entirety of which is hereby incorporated by reference.

BACKGROUND OF THE INVENTION

1. Field of the Invention

The invention generally relates to software emulation of optical communication networks, systems, nodes, modules and components.

2. Description of Related Art

Optical communication systems are a substantial and fast growing constituent of communication networks. The expression "optical communication system," as used herein, relates to any system which uses optical signals to convey information across an optical waveguiding medium, for example, an optical fiber. Such optical systems include but are not limited to telecommunication systems, cable television systems, and local area networks (LANs). (Optical systems are described in Gowar, Ed. Optical Communication Systems, (Prentice Hall, New York) c. 1993, the disclosure of which is incorporated herein by reference.)

Many optical communication systems are currently configured to carry an optical channel of a single wavelength over one or more optical waveguides. To convey information from multiple sources, time-division multiplexing (TDM) is frequently employed. In TDM, a particular time slot is assigned to each signal source with the complete signal constructed from portions of the signal collected from each time slot. While this is a useful technique for carrying plural information sources on a single channel, its capacity is limited by fiber dispersion and the need to generate high peak power pulses.

While the need for communication services increases, the current capacity of existing waveguiding media is limited. Although capacity may be expanded (e.g., by laying more fiber optic cables), the cost of such expansion is prohibitive. Consequently, there exists a need for a cost-effective way to increase the capacity of existing optical waveguides.

Wavelength division multiplexing (WDM) is now a commonly utilized technique for increasing the capacity of existing fiber optic networks. WDM systems typically include a plurality of transmitters, each respectively transmitting signals on a designated channel or wavelength. The transmitters are typically housed in a first terminal located at one end of a fiber. The first terminal combines the channels and transmits them on the fiber to a second terminal coupled to an opposite end of the fiber. The channels are then separated and supplied to respective receivers within the second terminal.

The WDM system described in the previous paragraph can be perceived as a point-to-point connection with multiple signals carried from one terminal to the other. However, it is frequently advantageous to add and drop channels at various locations between the two terminals. Accordingly, other network elements, such as add/drop modules are often provided along the fiber in order to inject and/or remove channels from the fiber. Moreover, if the fiber extends over long distances, it is necessary to segment the fiber into sections with each fiber section being coupled to another by an additional network element that amplifies the signal (e.g., an erbium doped fiber amplifier).

In addition to the information bearing channels described above, Condict '115 utilizes a service channel at a wavelength different than the information bearing channels and carrying diagnostic and span topology information that can also be transmitted through each span. Information associated with a span may be coupled via Ethernet connections to an internet protocol (IP) router. This IP router passes the information via the Internet to additional IP routers. A local area network (LAN) then transmits the information between the IP routers and to the network monitoring equipment. Finally, information associated with a span is similarly passed to network monitoring equipment through Ethernet links and an IP router.

The Condict '115 patent ensures proper operation of the WDM system by monitoring each network element. In the event of a failure, such as a fiber break, the communication system maintains its ability to monitor each network element by using, for example, a service channel separate from the main optical communication channel. Moreover, the communication system automatically responds to a fault by having each network element identify itself and report information about its operating status. Optical communication networks typically include an optical communication path and a plurality of network elements coupled to the optical communication path. The network elements typically include one or more optical, opto-electrical, electro-optical, or electrical components. A microprocessor-based controller (a.k.a. node control processor (NCP)) runs management and control software that manages, tracks and/or controls various functions of the node hardware.

In other words, the NCP may monitor and/or control hardware components of the node in order to maintain the functionality, tune performance and otherwise manage the optical network. For example, the status of a first optical component may be monitored by the first processor that generates a first electrical signal in accordance with the status of the first optical component. This status info may be used by the controller or transmitted to other controllers in the network in order to manage the component, the node, other components, other nodes, the network, etc. A service channel (e.g. in-band or out-of-band wavelength) is typically used to transmit such status and other management information.

Some of the challenges facing optical communication equipment vendors include development, testing and verification of components, nodes and systems. These tasks are made even more challenging, if not impossible, when the hardware is not available. In other words, some or all of the hardware components in a node may not be available to software engineering and testing groups due to production constraints, unavailability of components, prior commitments to customers, etc. The management and/or control software being written for these components and nodes, however, must be rigorously tested and validated before it can shipped to the customer. Without the necessary hardware to perform such tests, the software development and release may be delayed.

These problems are exacerbated by WDM systems, particularly high channel count WDM systems. For each channel there may be a set of hardware (e.g. transmitter, receiver, or other circuit packs) that is unique to that channel. As the channel count increases so does the number of corresponding circuit packs within network elements. Channel counts currently number about 100 but are expected to increase to several hundreds at least through product line and technology evolution. Thus, it becomes more and more cost prohibitive and logistically difficult to have full systems available in the quantities required for software application (i.e. agents) unit testing, software system integration, and validation testing particularly as the complexity of the system grows and various different types and versions of optical communications modules are developed. If not addressed, these problems potentially could affect product availability and product quality.

Thus, there is a need in the art for emulating certain hardware components of an optical communications so that the corresponding control and management software can be developed, integrated, tested and validated.

SUMMARY OF THE INVENTION

In order to address these problems, the invention was developed which emulates optical communications hardware and interfaces with nodal control processor(s) NCP(s). This emulator may execute on a workstation platform and emulate the optical behavior as well as appropriate communications hardware functionality so that the NCP may exercise functionality in a software development, integration or validation test environment.

In other words, the invention emulates optical networking hardware functionality to allow various levels of software application unit development, test and integration test without dependency on hardware availability.

The emulator is designed to execute in multiple modes to satisfy various diverse user requirements: single node circuit pack emulation, single span circuit pack emulation, and multi-span circuit pack emulation. All modes may be initiated from a common emulator setup/configuration mechanism that tailors the simulation session to the needs of the user.

More specifically, the invention may be characterized as a method of emulating the optical behavior of an optical communications system having a plurality of optical communications modules, including: generating a wavelength modeled object modeling at least a signal condition of an optical signal; generating a modeled object for each of the optical communications modules and including at least an optical power level field and a behavior modeling function modeling the optical behavior of the corresponding optical communications module; propagating the wavelength modeled object along a logical path of emulated optical communications modules; executing the behavior modeling function of the modeled object associated with the emulated optical communications module receiving the propagated wavelength modeled object; and storing the results of said executing in the associated modeled object.

The invention may also be extended to an optical communications system that includes a plurality of nodes. In such an implementation, the modeled objects are preferably organized into a plurality of nodes emulating the nodes of the optical communications system and the propagating step propagates a span modeled object between nodes, wherein the span modeled object includes the propagated wavelength modeled object.

The invention may also be extended to an optical communications system that includes a plurality of spans, each span having a plurality of nodes. In such an implementation, the modeled objects are preferably organized into a plurality of spans and nodes emulating the spans and nodes of the optical communications system and the propagating step propagates a multi-span modeled object between spans, the multi-span modeled object including the propagated wavelength modeled object.

The invention may also be extended to a wavelength division multiplexed system transmitting a plurality of optical signals at respective wavelengths. In such an implementation, the invention generates a plurality of wavelength modeled objects modeling at least the signal conditions and wavelengths of the optical signals; and propagates the wavelength modeled objects along a logical path of emulated optical communications modules.

The optical communications modules that may be emulated are many and varied and include an optical combiner combining at least some of the plurality of optical signals. If a combiner is present, the invention generates a combiner modeled object including an output signal power level field, the plurality of propagated wavelength modeled objects, and a combiner behavior modeling function modeling the optical behavior of an optical wavelength combiner; executes the combiner behavior modeling function and storing the results thereof in the combiner modeled object; and propagates the combiner modeled object to a next emulated optical communications module along the logical path of emulated optical communications modules.

The invention may also emulate an optical amplifier. In such a case, the invention generates an amplifier modeled object including an output signal power level field, an input power level field, pump power level field, the plurality of propagated wavelength modeled objects, and an amplifier behavior modeling function modeling the optical behavior of the optical amplifier; executes the amplifier behavior modeling function; and stores the results thereof in the amplifier modeled object.

Moreover, the behavior modeling function may not only perform mathematical calculations but also logical operations. An illustrative example is executing the amplifier behavior modeling function that includes overriding the signal conditions in the propagated wavelength modeled objects to Loss Of Signal if the value of the input power level field is less than a first threshold value or if the value of pump power level field is less than a second threshold value.

Executing the behavior modeling function may also include overriding the signal conditions in the propagated wavelength modeled objects to loss of frame if more than one transmitter modeled object has the same wavelength value.

The invention may also emulate an optical splitter feeding a plurality of optical receivers. In such a case, the invention generates a splitter modeled object including an output signal power level field, the plurality of propagated wavelength modeled objects, and a splitter behavior modeling function modeling the optical behavior of an optical splitter; generates a plurality of receiver modeled objects including an input signal power level field, a wavelength field, a signal condition field, one of the plurality of propagated wavelength modeled objects, and a receiver behavior modeling function modeling the optical behavior of an optical receiver; executes the receiver behavior modeling function and stores the results thereof in the receiver modeled object.

The wavelength modeled objects may further include a data rate field which permits the invention to execute a receiver behavior modeling function including overriding the signal condition in the receiver modeled object to loss of frame based on a determination of whether the data rate field of the propagated wavelength modeled object matches the data rate field of the receiver modeled object.

The execution of the receiver behavior modeling function may also include overriding the signal condition to Loss Of Signal in the receiver modeled object based on a determination of whether the signal condition field of the propagated wavelength modeled object indicates a signal unknown condition.

The execution of the receiver behavior modeling function may further include setting the input signal power level in the receiver modeled object to zero if the signal condition field of the propagated wavelength modeled object indicates a loss of signal condition.

The invention may also emulate an optical backplane and perform the execution step in an optical backplane emulator. In such an implementation, the invention maintains optical attributes at each of the emulated optical communications modules and updates at least one of the optical attributes when said executing step results in a change to a corresponding optical attribute field in the modeled object associated with said executing step. The execution step may also be performed by the emulated optical communications modules.

The invention is also capable of commanding a change in at least one of the modeled objects; executing the behavior modeling function in the modeled object changed by said commanding step; and storing the results of said executing in the associated modeled object.

The invention also includes a software emulation method for emulating the optical behavior of a system of optical communications elements of an optical communications system wherein the system includes hardware node elements and at least some of the hardware node elements include a nodal control processor and a bus, the method comprising: maintaining modeled objects for each of the optical communications elements being emulated wherein each of the modeled objects includes a behavior modeling function modeling the optical behavior of the corresponding optical communications element; receiving a first behavior event object trigger associated with a first emulated optical communications element; executing the behavior modeling function of the modeled object associated with the first behavior event object trigger; and updating the modeled object affected by the execution of the first behavior modeling function.

The inventive method may also include generating the first behavior event object trigger when at least one of the modeled objects has been received by the first emulated optical communications element.

The inventive method may further include maintaining optical attributes of the emulated optical communications elements; changing at least one of the maintained optical attributes of the emulated optical communications element affected by the execution of the first behavior modeling function; and sending a second behavior object trigger to the emulated optical communications element associated with the optical attributes changed by said changing step.

The inventive method may still further include executing the behavior modeling function of each modeled object affected by the first behavior event object trigger; and updating the modeled objects affected by the execution of the behavior modeling functions executed by said executing step.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 7a–k include diagrams of various modeled objects that are utilized by the inventive emulator to determine optical behavior and to propagate changed optical conditions from one emulated process to another;

DETAILED DESCRIPTION OF INVENTION

The following detailed description of the invention refers to the accompanying drawings. The same reference numbers in different drawings identify the same or similar elements. Also, the following detailed description does not limit the invention. Instead, the scope of the invention is defined by the appended claims and equivalents thereof.

The expression "optically communicates" as used herein refers to any connection, coupling, link or the like by which optical signals carried by one optical system element are imparted to the "communicating" element. Such "optically communicating" devices are not necessarily directly connected to one another and may be separated by intermediate optical components or devices. Likewise, the expressions "connection" and "operative connection" as used herein are relative terms and do not require a direct physical connection.

Figure 1A:
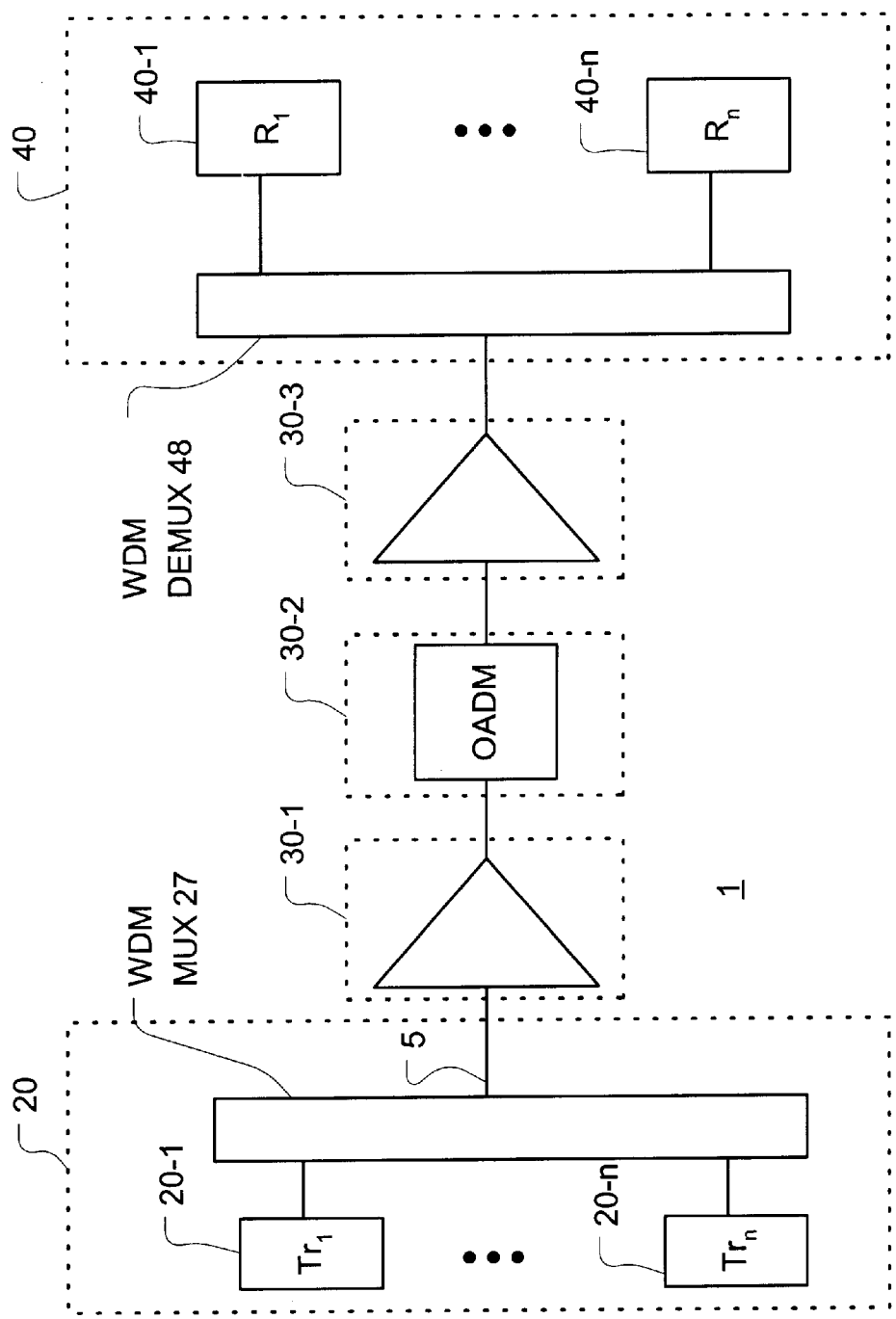
FIG. 1a is a high-level simplified block diagram of a wavelength division multiplexed (WDM) communications system showing major components and their organization.

FIG. 1a is an example of a simplified and conventional WDM (wavelength division multiplexed) optical communications system 1. FIG. 1a is presented to provide some context and background as to typical hardware that is used in a WDM system. In a typical WDM system a plurality of wavelengths are transmitted and combined, placed on a fiber, amplified, split into separate channel wavelengths, and detected.

The WDM system 1 shown in FIG. 1a includes a west terminal 20 that transmits and combines a plurality of wavelength channels; a chain of optical line amplifiers (OLA) 30-1, 30-3 to maintain signal strength over long distances; and an east terminal 40 that splits and detects the channels. The west terminal 20 includes a plurality of transmitters $Tr_1$ to $Tr_n$ (20-1 to 20-n) each of which emits one of a plurality of optical signals. Each of the plurality of optical signals is at a respective one of a plurality of wavelengths. The optical signals are output to and combined (e.g. by using a conventional WDM multiplexer 27 as shown, a series of combiners, etc) onto an optical communication path 5, comprising, for example, an optical fiber. A chain of optical amplifiers such as OLA 30-1 and OLA 30-3 are coupled to optical communication path 5. Also, an OADM (optical add drop multiplexer) 30-2 is interposed between OLA 30-1 and 30-3. Like the OLA 30, the OADM is a conventional module in and of itself.

The east terminal 40 includes a WDM demultiplexer 48 is coupled to optical communication path 5 at the end of the amplifier chain. Each of the outputs of WDM demultiplexer 48 are coupled to a respective one of receivers $R_1$ to $R_n$ (40-1 to 40-n), which convert the optical signals to corresponding electrical signals.

A fully populated WDM system may include more than a hundred channels which requires a corresponding number of transmitters $Tr_n$ and receivers $R_n$. To fully test the software that monitors and manages the system 1 a large quantity transmitters $Tr_n$ and receivers $R_n$ would be necessary. As detailed above, however, it may not be possible or economical to tie up such a large quantity of expensive equipment to conduct software testing. The invention resolves this issue by emulating the optical behavior of various optical communications modules such as transmitters and receivers to permit embedded software to be developed and tested.

Figure 1B:
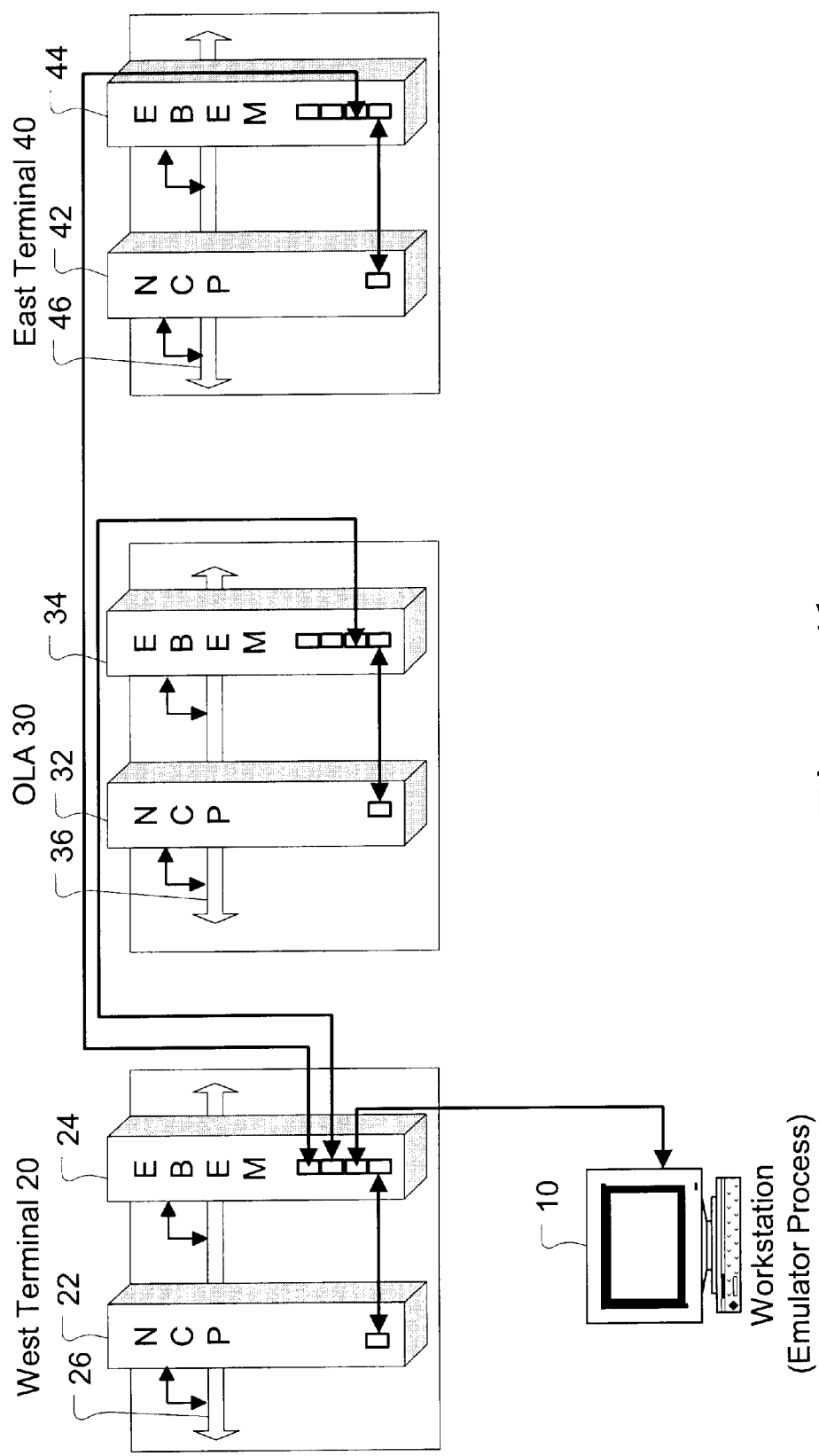
FIG. 1b is a high-level block diagram illustrating a hardware configuration of the invention for emulating the optical behavior of a single span of optical communication elements.

FIG. 1b illustrates a skeleton of an optical communications network that may be utilized by the inventive emulation software. The network skeleton includes a west terminal 20, an optical line amplifier (OLA) 30 and an east terminal 40 much like the WDM system 1 in FIG. 1a but lacking many of the optical communications modules (circuit packs) such as transmitters and receivers. Each of the terminals 20, 40 and the OLA 30 includes a chassis having a back plane (including back plane busses 26, 46, 36, respectively) to which are connected a nodal control processor (NCPs 22, 42, 32, respectively). The NCPs host the embedded software tasked with, for example, monitoring and controlling the node, circuit packs within a node, the span, multiple spans, and/or the network.

As mentioned above, one of the advantages of the invention is to enable development and testing of various software, such as the NCP embedded software, even though a full complement of optical networking hardware is unavailable. The system shown in FIG. 1b, for example, is missing a wide range of optical communication modules such as the transmitters, receivers, combiners, routers, and splitters that are typically part of the end terminals (e.g. west and east terminals 20, 40) of an optical communications network. Likewise, the OLA 30 is missing other optical communications modules such as pump modules, service channel modem, etc.

If all of the hardware is available, and no emulator is used, the basic hardware shown in FIG. 1b would also include a variety of optical communications modules (a.k.a. circuit packs that connect to the bus in each of the nodes). Instead of providing these optical communications modules, the invention emulates such modules in the workstation 10. More specifically, the invention emulates the optical behavior of optical communications. Thus, in place of the physical circuit packs, emulated circuit pack processes are hosted by the workstation 10 as further described below.

The OLA 30 is but one example of optical nodes that may be included in the optical communication system. Other examples include an OADM (optical add drop multiplexer) and an optical switch.

Each of the nodes for which emulation processes may be utilized also includes an EBEM (Ethernet bus extender module) or equivalent. For example, the west terminal 20, OLA 30, and east terminal 40 include EBEMs 24, 34, 44 respectively connected to the backplanes 26, 36, 46. The EBEMs capture data present on the respective back planes and forward such data to the workstation 10 via an Ethernet connection. The EBEMs also provide data from the workstation 10 to the NCPs. In other words, the EBEMs function as a data bridge between the back plane bus 26, 36, 46 and an Ethernet bus to which the workstation 10 is connected such that data may be exchanged between the workstation 10 and the NCPs 22, 32, 42. If the bus 26 is a PCI bus, then the EBEM 24 would be a PCI/Ethernet bridge. Of course, the particular type and selection of bus and network protocol (e.g. PCI and Ethernet) are not important and may be varied as known in the art.

The data fed back from the workstation 10 to the NCPs include the various optical attribute values from the modeled objects (e.g. optical input and output powers, signal conditions, etc). Although outside the scope of this application, this information could also include the electrical behavior of the emulated circuit packs to further improve the ability of the NCPs to perform OAM&P and control functions.

The EBEMs shown in FIG. 1b may also function as a switch (e.g. an Ethernet switch) such that data from and to the NCPs 22, 32, 42 are routed through EBEM 24 to workstation 10 and vice versa.

EBEMs or their equivalent are necessary because the NCPs 22, 32, 42 communicate with at least some of their respective circuit packs using the back plane. For example, NCP 22 communicates with a transmitter circuit pack (not shown, but normally connected to backplane 26) via the backplane 26. The EBEM 24 captures all of the data and commands that are normally exchanged between the NCP 22 and the respective circuit packs so that such data and commands can be exchanged with the emulated circuit pack(s) in the workstation 10.

The communication between the NCP and the hardware circuit packs within a network element may take several forms. In order to emulate such hardware circuit packs and use such different communications protocols, the invention must provide for each of these various communication pathways. To that end, a connection is provide between NCP 22 and EBEM 24 such that the NCP 22 may communicate with some emulated circuit packs residing in the workstation 10 using MAC layer packets transmitted on an Ethernet pathway via the EBEM 24/NCP 22 Ethernet connection. The NCP may also communicate via the backplane bus 26 with emulated circuit packs hosted in workstation 10. Since the backplane bus 26 uses a different protocol than Ethernet (e.g. TDM bus packets encapsulating Ethernet MAC layer packets) the EBEM 24 functions as a data bridge between the two protocols.

The NCPs 22, 32, 42 are the nodal control processors that are conventionally and routinely included in optical communications nodes and may be constructed with a microprocessor based architecture with associated memory, I/O and other conventional components. The NCPs include embedded software that, for example, monitors and controls the functions of the associated node.

Workstation 10 may be constructed with a conventional computer workstation. The current implementation of the invention happens to use a UNIX-based workstation but workstation 10 may use other operating systems. The workstation 10 communicates with the EBEMS 24, 34, 44 and the EBEMs communicate with each other via a conventional Ethernet protocol. While Ethernet provides a convenient and useful communications the invention is not limited to Ethernet and may use a variety of other communications protocols.

As further described below, the workstation 10 hosts the emulation software that is used to emulate various optical communications modules located in one or more of the terminals (e.g. west terminal 20, OLA 30 and east terminal 40).

Figure 2:
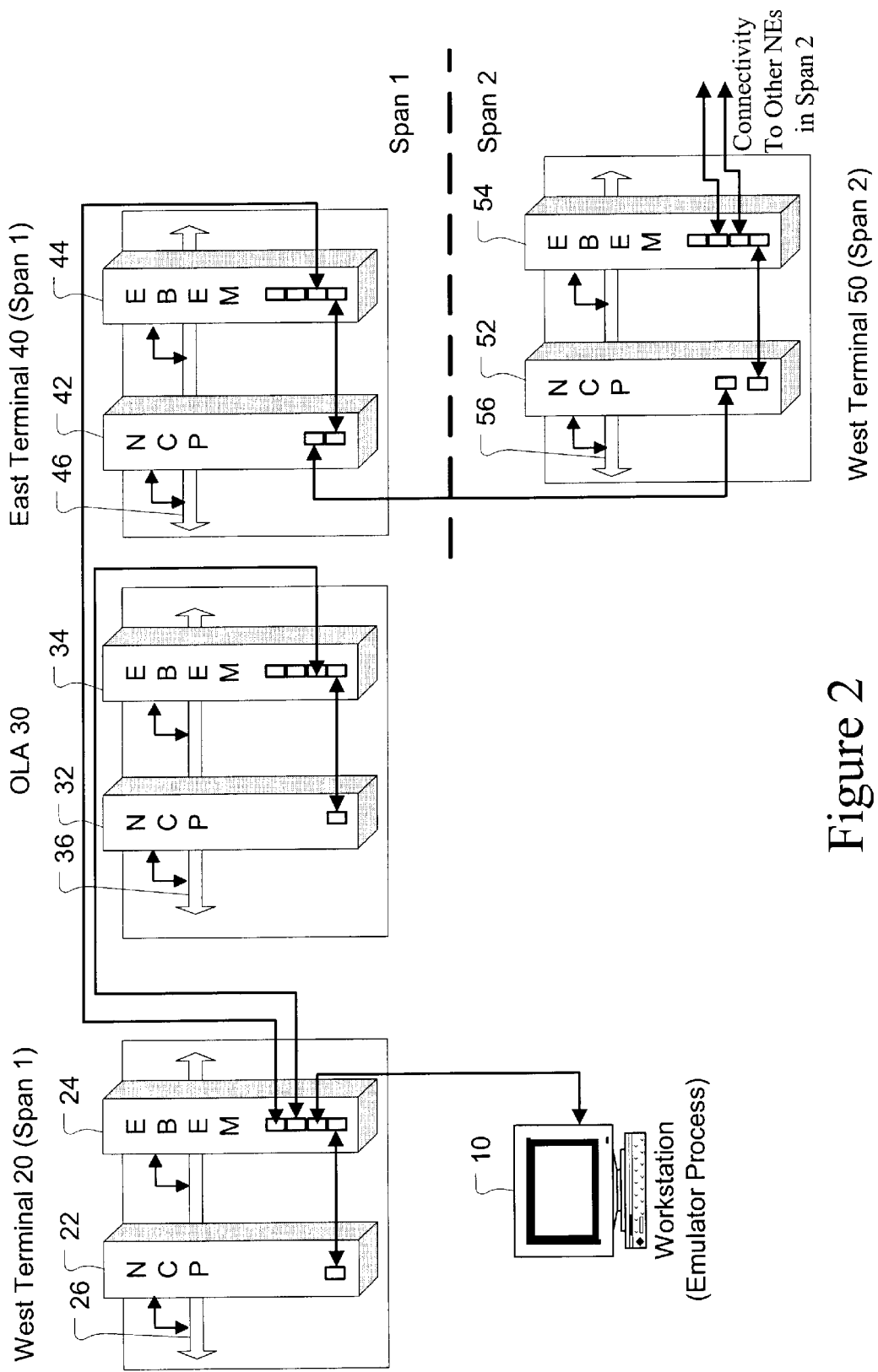
FIG. 2 is a high-level block diagram illustrating a hardware configuration of the invention for emulating the optical behavior of a multiple spans of optical communication elements.

In contrast to FIG. 1b which illustrates a simplified hardware configuration for a single span of an optical communications network, FIG. 2 shows a simplified multi-span configuration. More precisely, FIG. 2 shows a first (Span 1) and a second (Span 2) architecture which is useful for describing the multi-span emulation processes. It is to be understood that the invention is not limited to one or two spans and may be used to emulate a large number of spans, nodes, and circuit packs.

As shown in FIG. 2, the network may include a second span (Span 2) a portion of which is illustrated. FIG. 2 only shows the west terminal 50 of Span 2 but indicates connectivity to other NE (network elements) in span 2 (e.g. an OADM, OLA, or a west terminal). As further shown in FIG. 2, the east terminal 40 of span 1 is connected to the west terminal 40 of span 2 via an Ethernet connection between NCPs 42, 52. Also, the connections between EBEMs 24, 34, 44 is an Ethernet pathway and the EBEM 24 functions as an Ethernet switch to route MAC packets between workstation 10 and the respective NCPs 22, 32, 42.

Figure 3:
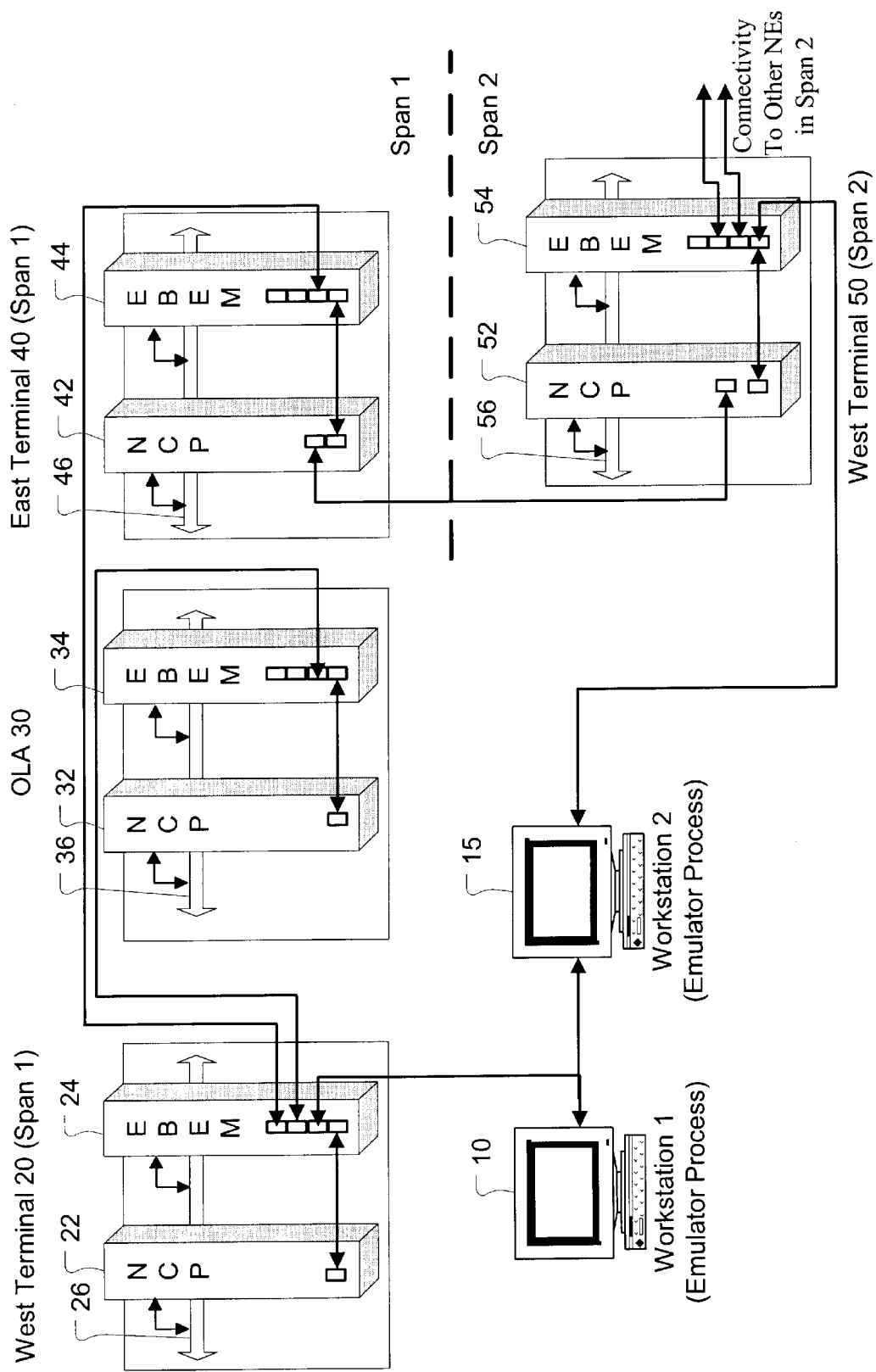
FIG. 3 is a high-level block diagram illustrating an alternative hardware configuration of the invention using multiple workstations for hosting the software emulator.

FIG. 3 shows an alternative hardware configuration for emulating optical communications modules in a multi-span environment. In this alternative, multiple workstations are used instead of the single workstation illustrated in FIGS. 1b and 2. Specifically, workstation 10 emulates the optical communications modules in span 1 while workstation 14 emulates the optical communications modules in span 2. An Ethernet connection is also provided between workstations 10 and 15 so that certain information may be exchanged between spans as further described below.

This concept of multiple workstations may be further extended. For example, a workstation for each span may be used or a workstation for every N spans may also be used. Processing speeds and communication delays may affect the choice of how many workstations are used for the particular optical communications network whose components are being emulated. In general, it is desirable to load balance among multiple workstations as the number of emulation processes increases.

Figure 4:
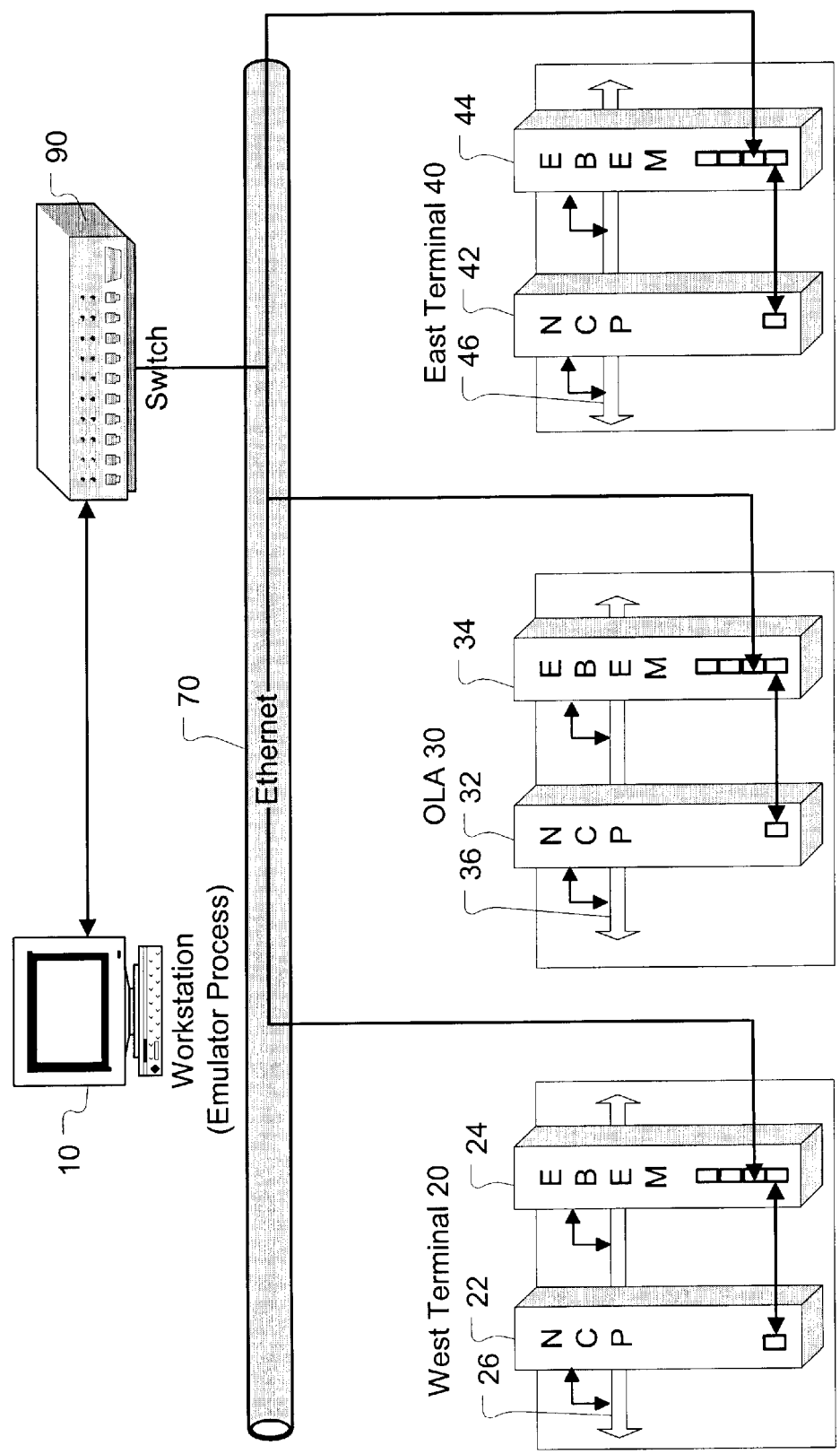
FIG. 4 is a high-level block diagram illustrating another alternative hardware configuration of the invention using alternative network switching hardware for routing communications between the hardware and the emulator hosted on the workstation.

FIG. 4 shows another alternative hardware configuration. Instead of using the switching function of the EBEMs to route data between the workstation 10 and the span(s), a separate switch 90 may be utilized as shown in FIG. 4. In this alternative, each of the EBEMs 24, 34, 44 exchanges data with the workstation 10 via Ethernet 70 and switch 90. The switch 90 is a conventional Ethernet switch that uses conventional routing and switching protocols to route MAC packets containing data between the various elements.

Figure 5:
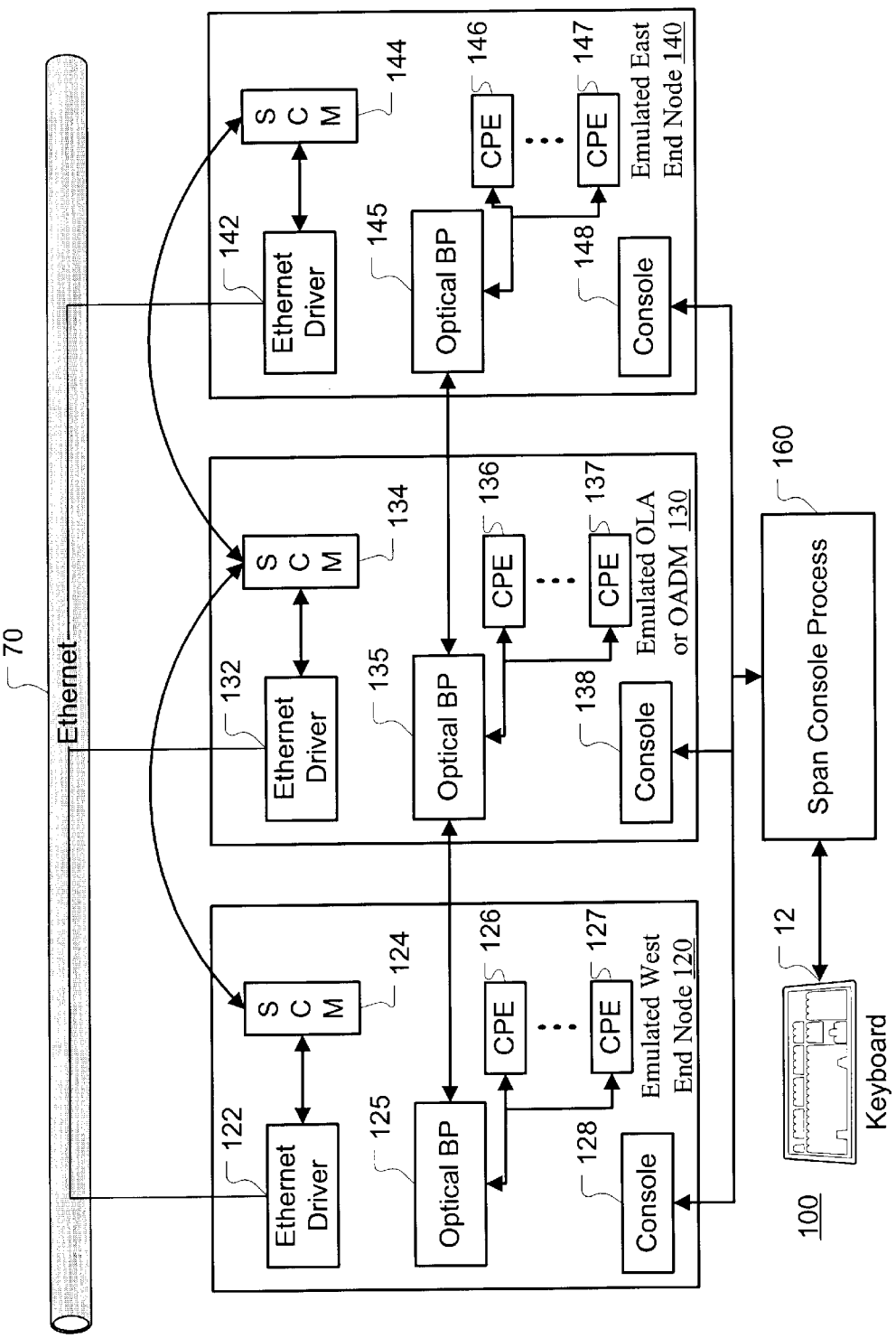
FIG. 5 is a mid-level block diagram illustrating components of the inventive emulator software, their arrangement within emulated nodes, and the communications topology for emulator components of a single span of an optical communications system.

FIG. 5 illustrates significant components of the emulator system 101. The emulator system 101 software is hosted in the workstation 10 and includes an emulation process for the optical communications modules (circuit packs) that are not present in hardware form. More specifically and as shown in FIG. 5, the emulator includes an emulated west end node 120, an emulated OLA 130 and an emulated east end node 140. The emulated west end node 120 includes a circuit pack emulator (CPE) 126, 127 for each unit of optical communications hardware being emulated. Although two CPEs 126, 127 are shown it is to be understood that this number may vary depending upon which hardware components are to be emulated. The CPEs 126, 127 are logically connected to the optical backplane (BP) 125. Moreover, the optical backplanes 125, 135 and 145 are also logically connected to one another.

The logical connections described above (e.g. between the CPEs 126, 127 and the optical backplane 125) designate information flows between the various emulation processes. As further described below, a process in the CPE 126 may affect a downstream CPE 127 so that optical attributes changed by CPE 126 should be propagated to the CPE 127 (via optical backplane process 125). These logical interconnections may be stored in a configuration file and may include, for each CPE, both upstream source(s) of the input signal(s) and downstream sink(s) for the output signal(s).

Figure 10:
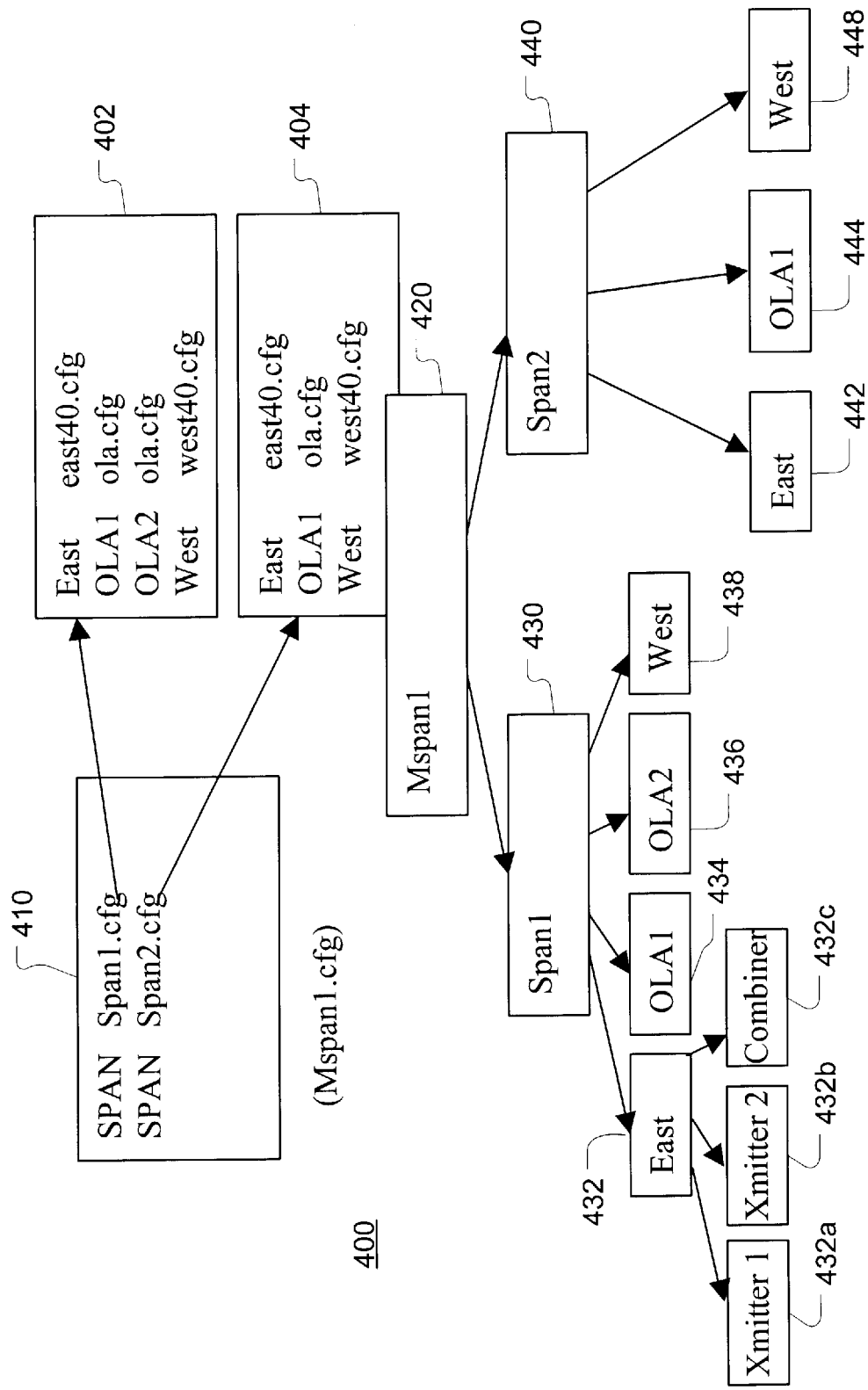
FIG. 10 illustrates the hierarchical arrangement of configuration files that are utilized by the inventive emulator to determine the topology of the optical communications system and to determine where to propagate changed optical modeling objects.

FIG. 10 illustrates such interconnection configuration files that are used by the emulator to establish logical connections and dataflows. The multi-span configuration file (Mspan1.cfg) 410 includes two span configuration files (Span1.cfg 402 and Span2.cfg 404) corresponding to the two spans of the optical communications network being emulated. In a hierarchical fashion, the Span1.cfg file 402 includes configuration files for the east terminal, OLA 1 (the first optical line amp), OLA 2, and the west terminal of the first span. The Span2.cfg file 404 includes configuration files for the east terminal, OLA 1, and west terminal of the second span. The hierarchy of the configuration files 420, 430, 440, 432, 434, 436, 438, 442, 444, and 448 is further shown in the bottom portion of FIG. 10. Each of these low level configuration files includes logical connections between the corresponding nodes in a span (e.g. the east terminal, OLA 1, OLA 2, etc) and modules (transmitter 1, transmitter 2, combiner) within each node (for ease of illustration only configurations files 432a–c for the emulated circuit packs of East node 432 are shown).

The configuration files shown in FIG. 10 are initially programmed using the default optical connectivity that mirrors how the various optical communications modules are physically arranged and optically connected. The default configuration includes certain fixed connections (e.g. individual transceivers are always connected to a wavelength combiner) and certain configurable connections (typically external optical connectivity) that may be altered. As related above, the connectivity includes logical connections within a node (e.g. within the west end node 120) as well as logical connections between nodes and between spans.

In addition to the emulation of optical communications modules, the invention may also emulate console processes such as consoles 128, 138, 148 and 160. Such console processes emulate certain hardware craft interfaces that are used to send commands to the network and receive data therefrom. The keyboard 12 may be used to input such commands to the span console process 160 hosted by workstation 10. The span console process takes such commands and communicates with the emulated hardware components addressed by the commands via console processes 128, 138, 148.

Figure 6:
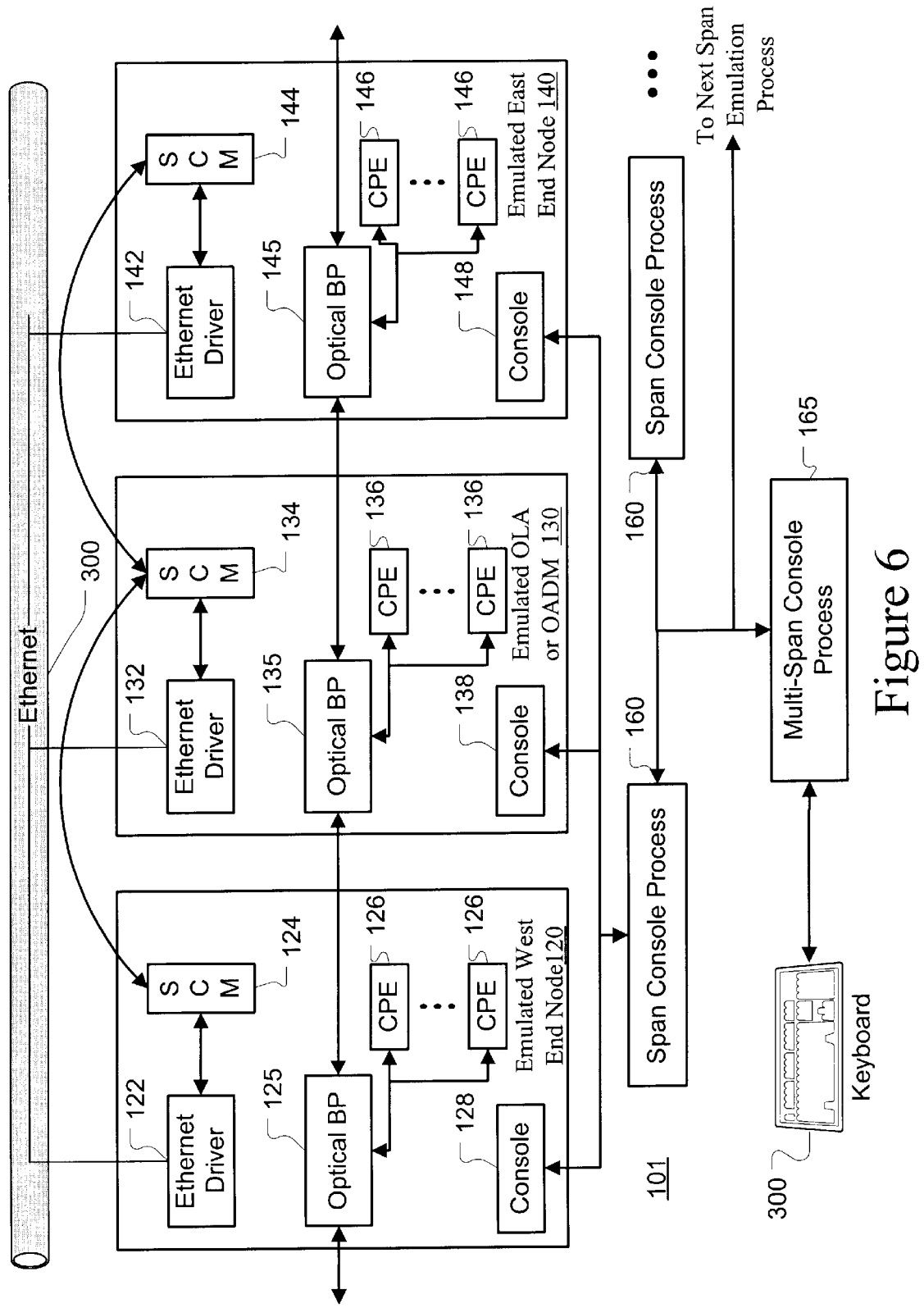
FIG. 6 is a mid-level block diagram illustrating components of the inventive emulator software, their arrangement within emulated nodes, and the communications topology for emulator components of a multi-span optical communications system.

FIG. 6 illustrates a multi-span console process 160 that is used to receive multi-span commands. The multi-span commands are distributed to the relevant span console processes 128, 138, 148 depending upon to which of the spans the commands relate. Since the console commands may be directed at a specific circuit pack emulation, node emulation span emulation or multi-span emulation, the multi-span console processes 160 are quite useful in distributing the command to the correct emulation process(es).

An example of console commands that are handled by the console processes 128, 138, 148 is the attribute override command. More specifically, modeled attribute values may be overridden through console commands to explicitly set the value of an attribute. As more fully explained below, each of the emulation processes model certain optical attributes of the optical communications hardware being emulated. The attributes may have configured values as a default. The values of such attributes may be altered by using the console processes. Such alterations are quite useful for developing, testing, and validating software designs because they permit a fuller exercising of the software to simulate unusual conditions, failures, or sequences of events.

The span and multi-span console processes 160, 165 also operate to translate raw commands from the keyboard into a format compatible with the CPEs 126, 127, etc. The console processes 160, 165 also distribute the commands to the appropriate CPEs by, in essence, acting as a demultiplexer. This distribution function relates to spans, nodes and below such as bay, shelf, slot designations (equipment location/address may be designated by the span, equipment bay, shelf within bay, and slot within shelf) so that the command arrives at the correct process emulating the corresponding hardware.

Moreover, several commands may be strung together into a script to simulate a particular hardware scenario, test sequence, event sequence, error events, etc. Such scripts may be independently created based on hardware test scenarios and fed to the emulator via the span and multi-span console processes 160, 165.

Other software components of the emulator include the Ethernet drivers 122, 132, 142 that are used to communicate with the workstation 10 and, thereby, the NCPs using the Ethernet protocol. The Ethernet drivers are conventional software components in and of themselves and, as such, will not be described further here.

In addition, a service channel modem (SCM) 124, 134, 144 emulator processes may be used to emulate hardware SCMs. Typically, an SCM or the like is used to transmit and receive a service channel communications link between the various nodes. Such service channels are used, for example, to conduct OAM&P (Operations, Administration, Maintenance and Provisioning) functions such as controlling amplifiers, communicating alarms, and monitoring network performance. SCMs may use an out-of-band optical signal such as 1610 nm to communicate on the fiber without interfering with the main data channels which utilize distinct wavelengths. An example of SCMs may be found in U.S. Pat. Nos. 5,798,855; 5,978,115 (also describing span management using the service channel); and U.S. Pat. No. 6,163,392 (also describing communications between NCPs and SCMs) which are all hereby incorporated by reference. A variety of other service channels configurations and hardware may also be emulated by the invention such as in-band service channel(s) and overlay communications not utilizing the optical network.

In a non-emulated (hardware) system, the NCP and SCM typically communicate via the backplane bus (e.g. backplane 26). In the emulator, this communication is implemented via Ethernet because the SCM is simulated on Workstation 10. To provide such dual functionality, a flag in NCP software may bet set to indicate that all SCM channel traffic will be sent and received via Ethernet and EBEM during the emulation mode.

The OBPs (optical backplane emulation processes) 125, 135, 145 act as central coordinators for the various emulated processes by handling the modeled objects and their flows to other emulated processes. More specifically, the OBPs 125, 135, 145 execute the behavior modeling functions contained in the modeled objects and generally support the optical modeling state machine.

The invention uses modeled objects in the process of emulating the optical behavior of communications modules. As more fully explained below, each OBP utilizes modeled objects that includes the optical attributes and a behavior modeling function (BMF) that models the optical behavior of the optical hardware being emulated.

FIG. 7a illustrates a prime example of such a modeled object: a lambda modeled object 300 (a.k.a. wavelength modeled object) includes fields representing the wavelength (e.g. a wavelength value conforming to the ITU grid or otherwise); signal condition (e.g. Loss Of Signal (LOS), Loss Of Framing (LOF), Loss Of Modulation (LOM), AISC condition, Signal OK); data rate (e.g. 2.5G/sec, 10G/sec, etc); JO field (emulating the J0 byte found in SONET overhead and perhaps indicating whether the SONET overhead JO byte is being used for its conventional purpose or whether some proprietary use is being made of the JO byte); and B1 error counts (an information item taken from the SONET B1 overhead byte indicating an error count).

The particular fields represented in the wavelength modeled object 300 may change depending upon the optical network being emulated. For example, the wavelength modeled object 300 may omit the JO field and B1 error counts field. Furthermore, additional fields may also be included in the wavelength modeled object 300.

FIG. 7b illustrates a transmitter modeled object 305 which includes an associated wavelength object 300 (one of the wavelength objects 300 is associated with each of the transmitter emulation processes), a transmitter power field (for simplicity this may be an ON/OFF indicator since most transmitters are designed to output a constant power but this field could also track the actual output power of the emulated transmitter); and a transmitter BMF. The transmitter BMF is quite simple and merely associates the correct wavelength modeled object 300 and passes this object 300 on.

Typically, lambda modeled objects 300 are initially included within or sent to the transmitter modeled object to emulate the generation of a channel wavelength of a WDM system but they could also be included within an OADM modeled object (e.g. the add path of an OADM).

In general, for each emulated circuit pack in a node that processes a DWDM wavelength (e.g. transmitters, combiners, amps, splitters, receivers), the wavelength signal conditions of all wavelengths supported by that emulated circuit pack are maintained in workstation 10. More specifically, the OBP of a particular node maintains wavelength objects 300 for each of wavelengths supported by the emulated circuit packs in that node.

Since the optical properties of an optical signal (e.g. signal wavelength conditions) in a hardware system may change as the optical signal propagates from component to component, the emulator processes also models these changes. Thus, the wavelength modeled objects 300 propagate so that appropriate signal property changes may be accounted for as the system emulates signal propagation. In other words, the optical property changes cascade from emulated network element to emulated network element.

FIG. 7c illustrates another example of a modeled object: a combiner modeled object 310 includes fields representing the output signal power level of the combiner and the BMF for the combiner. A combiner is a conventional element that combines a plurality of wavelengths to generate a WDM signal and is, for example, included within the WDM MUX 27 shown in FIG. 1a. Because multiple wavelengths are combined and because the signal wavelength conditions of each wavelength may be affected by various downstream CPEs and the combiner itself, the combiner modeled object 310 also includes the lambda modeled objects 300 for each of the wavelengths being combined. In general, there may be N such lambda modeled objects 300 so the combiner modeled object 310 includes N lambda modeled objects 300 as indicated in FIG. 7c.

The BMF of the combiner modeled object 310 is used to calculate a value for the output signal power level. Each channel wavelength source (e.g. a WDM transmitter or remodulator) that supplies the combiner with a channel must be accounted for by this BMF. The BMF first checks the signal condition field for each of the N lambda modeled objects 300. For each such lambda modeled object 300 in which the signal condition is other than $NO_{13}SIGNAL$ a contribution is made to the total output signal power level (e.g. each wavelength contributes $-X$ dBm to the combiner output signal (assuming a constant power X from each transmitter feeding the combiner). The loss of Y dBm through the combiners is also included in this combiner BMF as follows.

$$CombOutputSignal = (\#activeSignals * (-X\ dBm)) - Y\ dBm.$$

Some WDM systems include multiple stages of combining in order to combine a large number of channels. The second stage combiner may be called a router and such router further combines sets of wavelengths from multiple combiners or from a combiner and a set of transmitters. As such, the router modeled object 320 shown in FIG. 7d has many similarities to the combiner modeled object 310 and includes an output power level, M combiner modeled objects (each of which, in turn, includes N lambda modeled objects as further indicated in FIG. 9c), and a BMF. The router BMF calculates the output signal level as follows by taking into account the combined output signals (CombOutputSignal) of each combiner feeding the router signals as well as the loss ZdBm through the router as follows:

$$RouterOutputSignal = \Sigma CombOutputSignals - Z\ dBm$$

FIG. 7e illustrates a pump modeled object 325 that is used to model the optical behavior of an optical pump. Such pumps are routinely used to inject pumping light into an optical amplifier such as OLA 30-1 in FIG. 1a. The pump modeled object 325 includes fields representing the pump wavelength (if multiple pumps having different wavelengths are used to pump the amp), pump output power, and a pump BMF. Like the transmitter BMF, the pump BMF is quite simple and merely passes on pump wavelength and pump power values. The pump BMF may include, however, a threshold test that compares the pump power to a threshold and indicates a failed condition if the pump power is too low (some pumps require a minimum operating power before they are operational and the emulator may account for this property in the pump BMF).

FIG. 7f illustrates the amplifier modeled object 330 that is used to model the optical behavior of the OLA 30. The amp modeled object 330 includes the pump modeled object(s) 325 that was passed on and lambda modeled objects 300. The amp modeled object 330 also includes input power and the amp BMF.

Generally speaking, the OLA emulation is a simplified model that models the optical behavior of a real optical amplifier. The behavior modeling function for the OLA preferably predicts the total output signal power and ASE (amplified stimulated emissions) output of the OLA based upon a number of input parameters.

More specifically, the total output power of an optical line amplifier (OLA) is given by the sum of signal output power (PoutT) and ASE power (Pase). In formal terms, the total output power Ptotal is as follows:

$$Ptotal = PoutT + Pase$$

The signal power PoutT [in milliwatts (mW)] may be expressed as a function of the following parameters:

Total input power: PinT [dBm]

Pump power (e.g. of the 980 nm and 1480 nm pumps supplying pump light to the amplifier).

Thus, the equation for the signal output power PoutT may be expressed as follows:

$$PoutT=f(PinT, Ppump(s))$$

The ASE power (Amplified Spontaneous Emission) represents an unwanted noise contribution from the amplifier that degrades the OSNR (optical signal-to-noise ratio). However, the ASE power may be a significant part of the total output power and needs therefore to be taken into account. In this example where the 980 nm pump is held constant, the ASE power is a function of the following parameters:

Total input power: PinT [dBm]

Pump power

It is to be understood that the equations utilized herein to describe the operation of various BMFs are exemplary in nature and do not limit the scope of the invention. The mathematics for calculating optical performance parameters of an individual optical elements are generally known and the invention leverages such mathematics in an emulation system 101 described herein. Moreover, the BMFs are not limited to calculating optical signal powers and may be used to perform logical operations related to the optical signal such as changing the signal condition attribute to LOS (loss of signal) when the input signal strength falls below a threshold. Further examples of logical operations in the BMF are presented below.

The OLA emulator process 130, as well as many of the other emulated processes, also account for fiber loss information, preferably in dB, for support of optical behavior modeling. The fiber loss information is the loss associated with the emulated fiber span to which the emulated OLA 130 is logically connected. The amp input power to a node is the amp output power of the previous node less the loss associated with the fiber span. Fiber loss is preferably part of the BMF for the input power level of an OLA. Likewise, the fiber loss information may also be part of the BMF for other modeled objects to account for the loss associated with the fiber span to which the hardware emulated by the CPE is connected.

Another component of the amp modeled object 330 is the output power field which is used to store the results of the BMF operating on the input signal value. The output power field of the amp modeled object 330 will serve as the input power level to the next downstream emulated optical element the existence and connectivity of which is identified in the configuration file (see FIG. 10).

The amp modeled object 330 also includes a set of wavelength modeled objects 300. If the upstream source of the emulated wavelengths is the router then the wavelength modeled objects included in the amp modeled object 330 are copied from the wavelength modeled objects in the router modeled object 320.

If the optical signal traffic is bi-directional a set of such wavelength modeled objects is maintained for both east bound and west bound traffic. Likewise a set of such objects may be maintained for both clockwise and counterclockwise traffic if the network is a ring topology.

Figure 14:
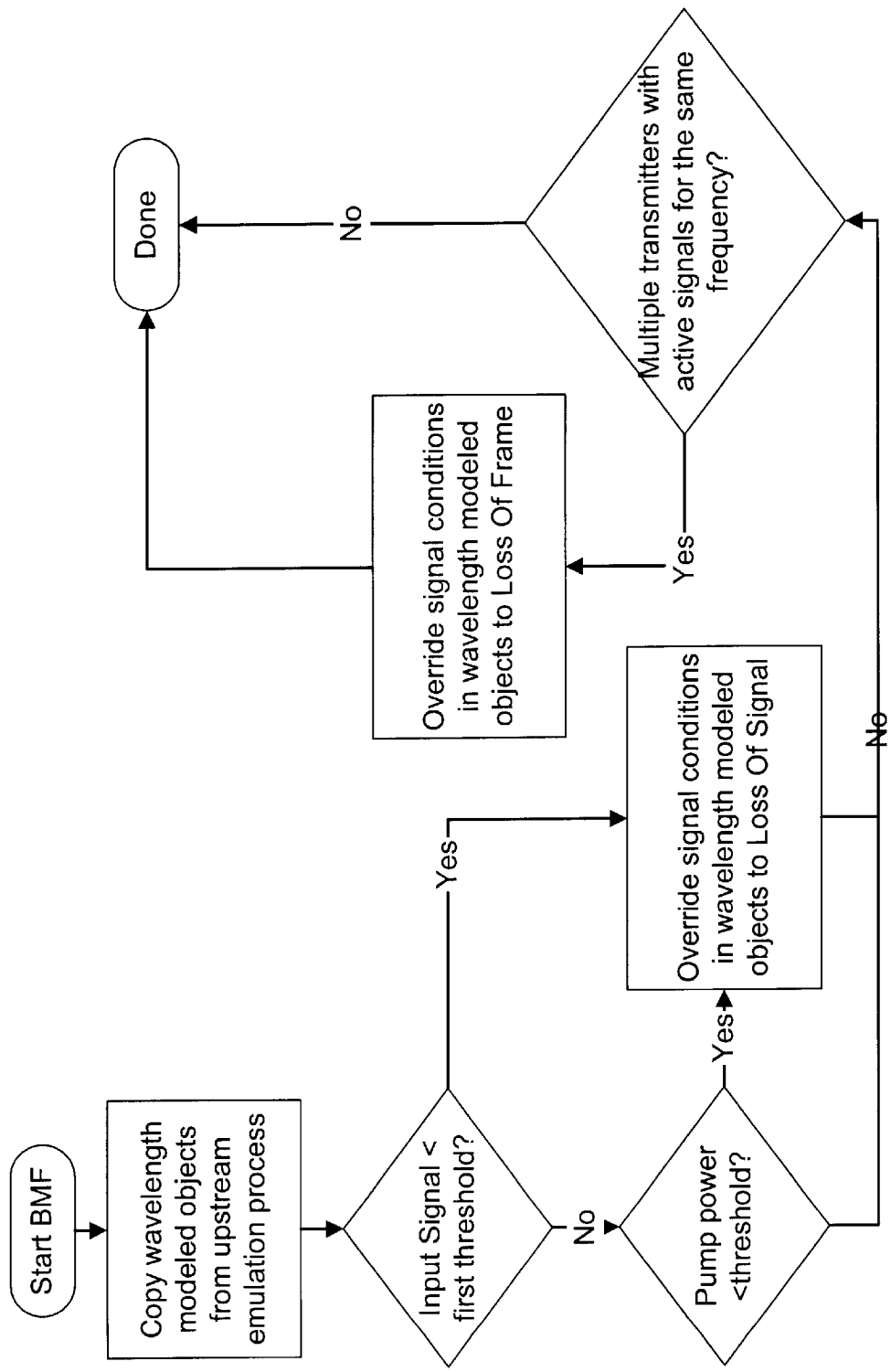
FIG. 14 is a mid-level flowchart illustrating logical operations executed in a behavior modeling function such as an amplifier behavior modeling function.

As shown in the flowchart of FIG. 14, the amp BMF performs the following logical operations. When processing a signal from the span (terminating direction in an end terminal, or OLA), the set of wavelength objects 300 are copied from the external source line amp on another node as defined by the optical connectivity configuration files (in general terms the wavelength modeled objects from the upstream emulation process are copied). The signal conditions in these wavelength objects are overridden to Loss Of Signal if any of the pump (e.g. either the 980 pump or 1480 pump) laser power is below a certain threshold value or has otherwise entered a failed condition.

These signal conditions are also overridden to Loss Of Signal if the Input Signal is below a first threshold value, or if any of the OLA pumps are below a second threshold value or has otherwise entered a failed condition.

When copying the wavelength signal conditions from the emulated terminal, if the OBP 135 (executing the OLA BMF) finds multiple transmitters with active signals for the same frequency, the OBP 135 changes that wavelength signal condition to Loss Of Frame as further illustrated in FIG. 14.

The logical operations of the amp BMF shown in FIG. 14 may also be included in other BMFs. For example, the combiner BMF and splitter BMF may benefit from these logical operations. If this is done then the test for pump power against a threshold would be excluded from these logical BMF operations.

The optical system being emulated may also include a remodulator. An example of a hardware remodulator is described in U.S. Pat. No. 5,504,609 the disclosure of which is hereby incorporated by reference. Such a remodulator essentially acts to remodulate a optical signal at a first wavelength (typically a short reach signal at a SONET wavelength) to a second wavelength (typically a long reach signal having a wavelength compliant with the ITU grid). To that end, the emulator system 101 also tracks the wavelength mapping performed by a remodulator using a remodulator modeled object 340 as shown in FIG. 7g which includes a set of lambda modeled objects 300, an output power of the remodulator, and the remodulator BMF. The BMF should preferably account for any fiber loss or loss within the remodulator that degrades the optical signal.

On the emulated receiver-side of the system, the invention utilizes a few other types of modeled objects. In the hardware system, a WDM DEMUX 48 (e.g. including a splitter) may be used to split up the WDM signal into separate paths so that the receivers may extract the constituent signals (wavelengths) present in the WDM signal.

FIG. 7h illustrates the splitter modeled object 350 includes fields for the lambda modeled objects (to be sent to the receivers), the output signal, and the splitter BMF. The hardware splitter has an associated optical loss, S, that is modeled in the splitter BMF as follows.

$$OutputSig=(SplitterInputSig-S\ dBm)/N$$

where OutputSig is the output power level of the splitter, SplitterInputSig is the optical power of the active optical signals input to the splitter (e.g. signals with a LOS in the corresponding wavelength modeled object 300 do not contribute to the output signal power), S is the optical loss of the splitter (and any fiber path loss as a result of the fiber path between the splitter and the upstream optical element), and N is the number of splits or output channels.

It is also possible for the splitter to be implemented in two stages, with a so-called dual splitter followed by a splitter. The dual splitter, for example, would take the input signal having N channels and send half of it to the splitter while splitting up the other half into N/2 channels. In this case, the dual splitter would maintain a set of wavelength modeled objects 300 and output signal attributes for both the receivers and the splitter in order to track both optical paths that could be followed by the input signal. The separate dual splitter objects would be forwarded to the respective splitter and receiver process emulators for further processing.

Each of the receivers 40-1 (e.g. as shown in FIG. 1a) receives a split signal and segregates a particular channel wavelength from the WDM signal so received. In the emulator system 101, the receiver emulation process 127 inputs one of the wavelength modeled objects from the upstream source (e.g. the splitter). Since there are many such receivers an index value such as channel number is used to reference and retrieve the appropriate wavelength modeled object 300 from the collection of upstream wavelength modeled objects.

FIG. 7i illustrates a receiver modeled object 360 that may be used by receiver emulation processes 127 that are emulating an optical WDM receiver module. As shown, the receiver modeled object 360 includes an input power, wavelength, data rate, receiver BMF, and wavelength modeled object for that corresponding WDM channel.

Figure 15:
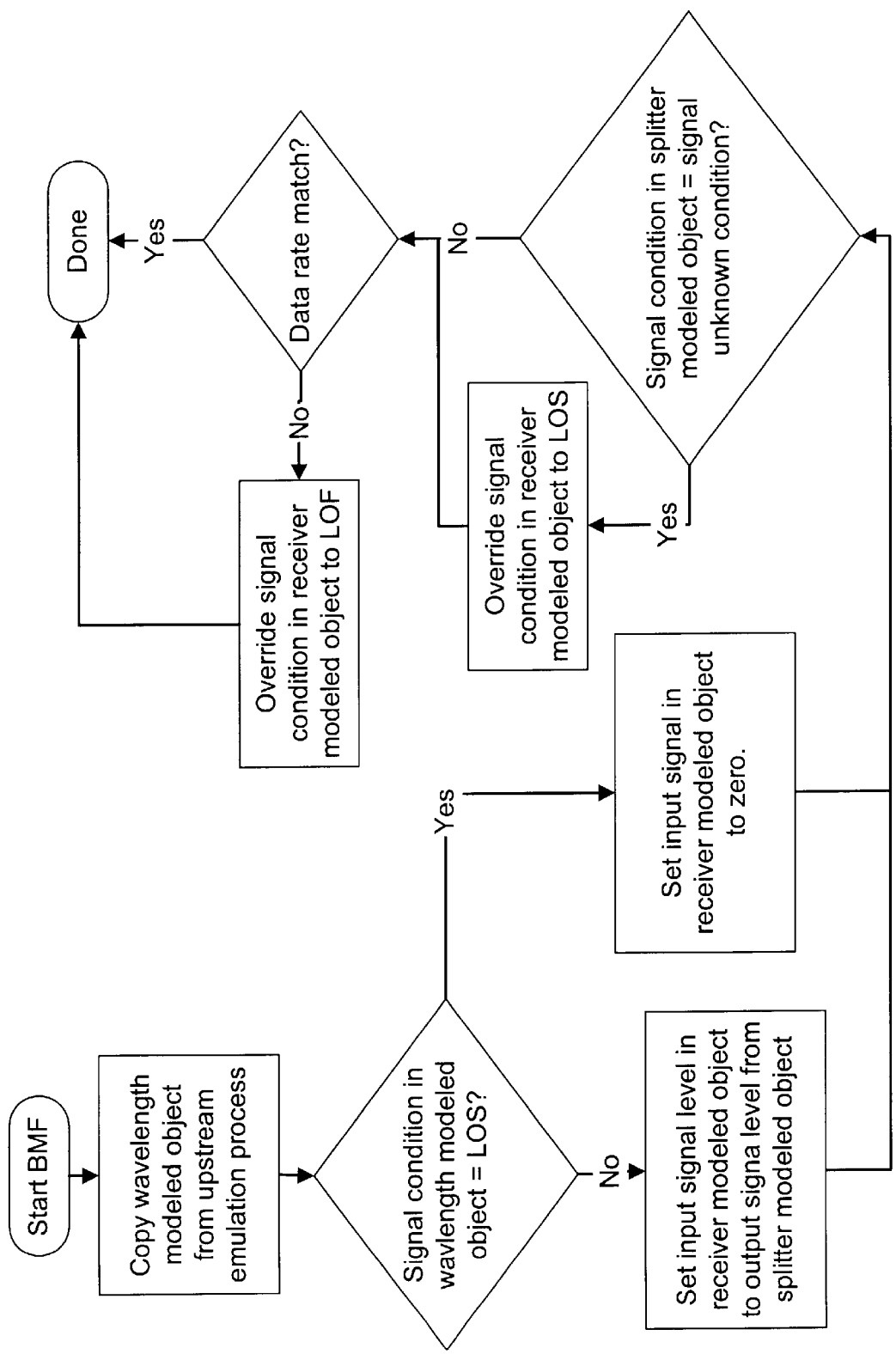
FIG. 15 is a mid-level flowchart illustrating logical operations executed in a receiver behavior modeling function.

The receiver BMF is largely a logical operation as illustrated in FIG. 15 and as further described below. First, the wavelength modeled object is copied from the upstream emulation process (the splitter in this case). The input signal is set to zero if the wavelength signal condition indicates Loss Of Signal. If the signal is OK, then the input signal is set to the output signal of the upstream element (splitter). The signal condition object from the splitter modeled object 350 is also tested to see if a Signal Unknown condition is present (transmitter not present in span). If so, then the signal condition in the receiver modeled object 360 is overwritten with a LOS (loss of signal) indication. Moreover, if the data rate from the upstream source does not match the receiver's data rate, then the receiver signal condition is overwritten to LOF (loss of frame) as further illustrated in FIG. 15.

Figure 8:
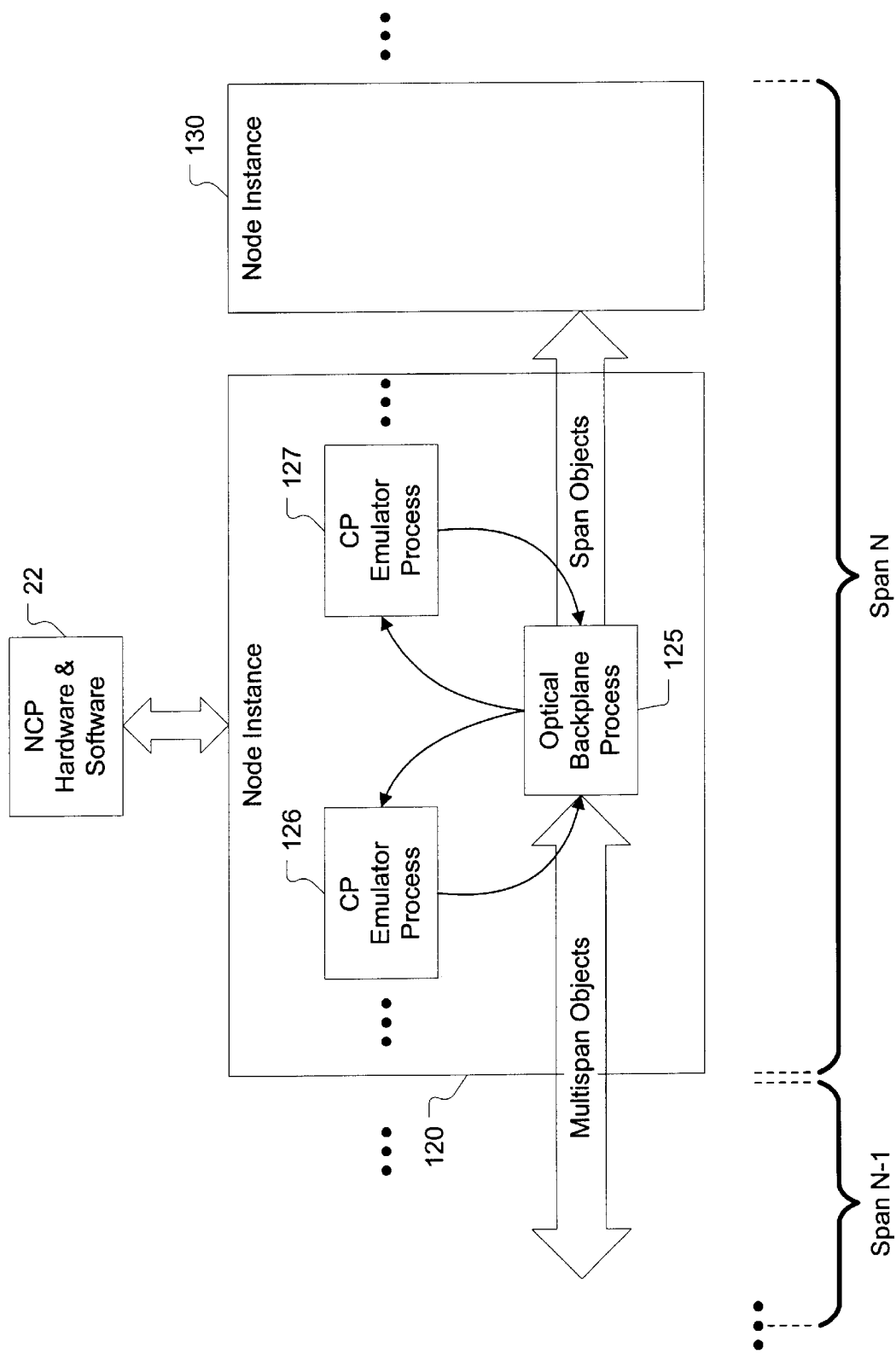
FIG. 8 illustrates a node instance, the emulated processes of circuit packs and backplane as well as the logical relationships of the emulated processes to one another and to other emulated processes in other emulated node instances.

FIG. 7j illustrates a span modeled object 370 which is the generalized depiction of the modeled objects sent within a span, from emulated node instance to emulated node instance. For example, the span modeled objects 370 are sent from node instance 120 to node instance 130 as illustrated in FIG. 8. The span modeled objects 370 contain the information necessary to cascade optical signal effects to downstream node instances. The span modeled objects 370 include, as shown in FIG. 7j, the output signal attribute of the upstream emulation process (e.g. the output signal attribute from emulated amplifier process) indicating the optical power level of the output signal. The span modeled objects 370 also include the wavelength modeled objects 300 from the upstream source and the SCM link status (the status of the service channel MODEM communication links including both transmit and receive links to the next downstream and upstream service channel MODEMs in the SCM chain).

The span modeled object 370 has no BMF associated therewith because the optical signal is not significantly affected by the traversal between nodes (other than the fiber loss which is accounted for in the next node's BMF).

FIG. 7k illustrates a multi-span object 380 which is the generalized depiction of the modeled objects sent between spans, from emulated node instance in span N–1 to emulated node instance in span N (specifically, the OBPs in each node instance handle the sending and receiving of the span objects 370 and multi-span objects 380). For example, the multi-span modeled objects 380 are received by node instance 120 from span N–1 as illustrated in FIG. 8. The multi-span modeled objects 380 contain the information necessary to cascade optical signal effects to downstream node instances in another span. The multi-span modeled objects 380 include, as shown in FIG. 7k, the output signal of the upstream emulation span process indicating the optical power level(s) of the output signal received from span N–1. The multi-span modeled objects 380 also include the wavelength modeled objects 300 from the upstream source and the multi-span BMF. The multi-span object may also include the SCM link status if the SCM is used for inter-span communication.

The multi-span BMF in the multi-span modeled object 380 may be used to map wavelengths particularly in a back-to-back terminal configuration used by some optical networks. In such configurations, wavelengths are terminated (O/E conversion), regenerated to a short reach (SR) output and output from a first terminal to a second terminal which inputs the SR signals and regenerates or remodulates (O/E/O) them onto a long reach (LR) output. The multi-span BMF essentially maps the SR outputs from the first terminal to the SR inputs of the second terminal.

Now that the structure of the modeled objects has been explained, a detailed explanation of how modeled objects are propagated among the emulated processes will be presented.

FIG. 8 illustrates major emulation processes within a node instance. In this case, the node instance 120 emulates the west end node 20 and includes CP emulator process 126, CP emulator process 127 and the optical backplane process 125. The CP emulators 126 may, in this case, emulate a number a transmitters, a combiner and a router. The node instance 120 communicates with the NCP hardware and software 22 (via Ethernet and backplane 26 as explained above and indicated by the double arrow in FIG. 7). The node instance 120 also communicates with node instance 130 (e.g. emulating an optical line amplifier 30).

Specifically, stream pipes (e.g. UNIX domain sockets) are used for inter-process communications such as between emulation processes. For example, the stream pipes are used to send span objects from node instance 120 to node instance 130 (a span object is shuttled from the emulated node 120 to the emulated node 130). Multi-span objects are also received by the node instance 120. The multi-span objects may originate from a previous span (Span N–1) emulated in the workstation 10 or from a multi-span console process 165.

Figure 9:
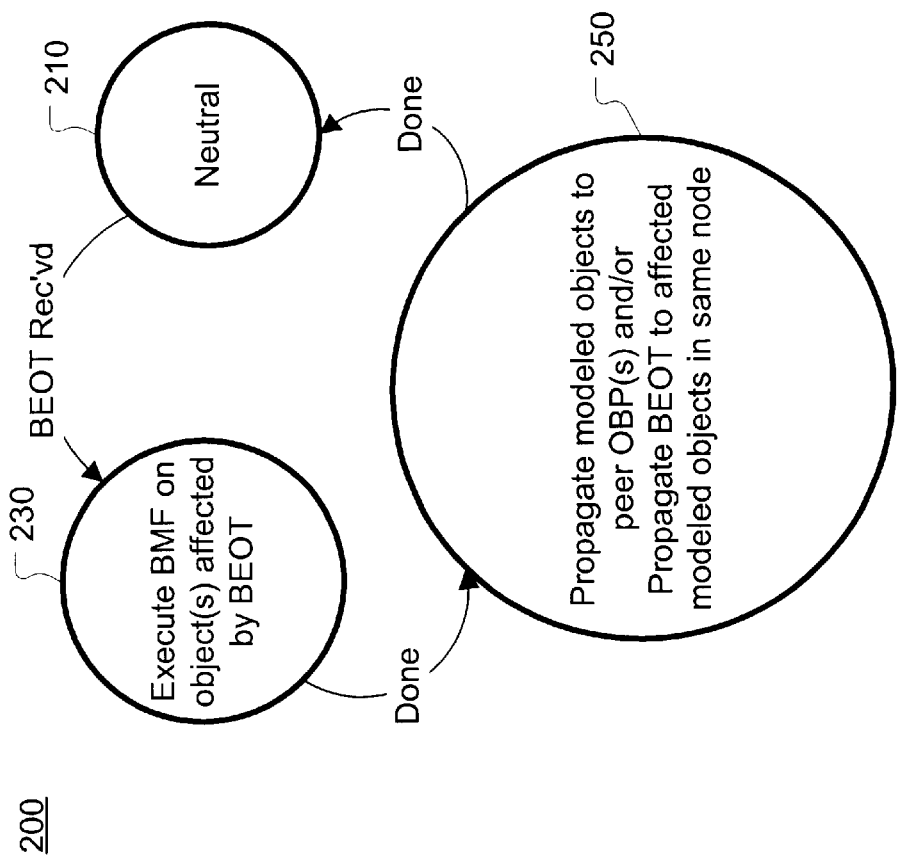
FIG. 9 is a state diagram showing logical states and state transitions that are utilized by the inventive emulator to emulate the optical behavior of optical communications elements.

The invention utilizes an optical modeling state machine 200 such as the one shown in FIG. 9. The optical modeling state machine 200 shown in FIG. 9 is one in which individual circuit pack emulation processes make those attribute values and state variables that effect optical attributes in other circuit pack and node emulation processes available to such other processes. The data forwarded is fed into the respective optical behavior modeling calculations of the affected emulation processes.

The state machine 200 is executed by each of the OBPs which act as coordinators and emulation engines for the various other emulators (e.g. circuit pack emulators 126) in an emulated node. Each of the OBPs maintains the modeled objects for its node and has associated CPEs (e.g. OBP 135 has associated CPEs 136, 137 as shown in FIG. 6). In addition, the OBPs within a span such as OBP 125 and 135 shown in FIG. 6 forward span modeled objects to each other while the OBPs of different spans (e.g. OBP of Span N–1 and OBP of Span N) forward multi-span modeled objects to each other.

Essentially, each of the circuit pack emulators (e.g. CPEs 126, 127, 136, 136, etc) and the console processes 160, 165, and the SCMs 124, 134, 144, etc) maintains certain attribute values and state variables particular to the circuit pack or console process being emulated. In other words, the each of the CPEs maintains an emulated information model particular to the type of circuit pack being emulated. When something changes in the emulated information model such as a changed attribute value, the CPE triggers a state transition in the OBP.

The event-driven state transitions of the state machine 200 executed by the OBP (e.g. OBPs 125, 135, 145) are shown in FIG. 9. In other words, FIG. 9 outlines the states and events that drive each of the state machines 200 executed by the OBP. More specifically, each OBP executes a state machine 200 for each modeled object maintained by that OBP. If the emulated node has four modeled objects the OBP for that node runs four state machines 200, one for each modeled object. The interplay between the state machines 200 running on an OBP and state machines running on peer OBPs will be described in detail below.

The initial default state of state machine 200 is a neutral state 210. This is a reflection of the event-driven nature of the emulation processes which essentially sit idle (neutral state 210) until a significant event occurs.

Upon the receipt of a BEOT (behavior event object trigger), the state machine 200 transitions to an execution state 230. As explained more fully below, the BEOT may be caused by the OBP receiving a changed optical attribute from a CPE within that node or by the OBP receiving a modeled object (span object or multi-span object) from a peer (upstream or downstream) OBP. In other words, a modeled object from one OBP propagates to the next downstream OBP and the receipt of that modeled object by the downstream OBP is a BEOT that transitions the downstream OBP into the execution state 230. Optical effects within a node are propagated via changes to optical attributes maintained by CPEs and the subsequent BEOT that such a change causes.

The BEOT may also be caused by one of the console processes (e.g. span console process 160 receives a command from the keyboard 12 or a script that changes one or more of the model object's attribute values).

In essence, the changed optical attributes and modeled objects propagate emulated optical effects from one emulation process to another and from one emulated node to another emulated node. The receipt of the changed optical attribute or the receipt of a modeled object is a BEOT that transitions the receiving OBP into the execution state 230.

The OBP in which the BEOT has been received transitions to the execution state 230. The execution state 230 causes the OBP to associate the BEOT with one of the modeled objects. This association may be performed by referring to the configuration file 400 (e.g. in the case of receiving a span object 370 or multi-span object 380) or by knowing which CPE's attribute value has changed that caused the BEOT (e.g. the changed attribute value sent to the OBP that serves as a BEOT may also identify the CPE whose attribute has changed) such that the appropriate modeled object may be associated with the BEOT. With this association, the OBP can execute 230 the BMF found in the modeled object associated with the BEOT.

A variety of examples are presented below of this execution 230 but in general the BMF calculates the effect on the modeled object's attribute values (modeling the optical behavior of the emulated optical component) caused by the BEOT. If the BEOT affects more than one modeled object, then the BMF of each such affected modeled object is also executed 230.

As mentioned above, executing 230 the BMF may result in a changed optical attribute. This change is used to update the associated modeled object and to update the corresponding attribute maintained by the CPE. In other words, the result of BMF calculations is used by the OBP to change a value of a corresponding attribute contained in the associated modeled object and to update the corresponding attribute maintained by the associated CPE. For example, the OLA BMF of the amp modeled object 330 calculates the output power. This output power value is used to update the output power attribute maintained by the OLA CPE and to update the output power field in the amp modeled object 330 maintained by the OBP.

When the execution state 230 is completed, the OBP transitions to the propagate state 250. The propagate state 250 propagates optical effects along the emulation processes as generally described above. Specifically, if any change is made to the modeled object associated with the BMF being executed 230 then the propagation state 250 causes the OBP propagate this change by sending a modeled object (span object 370 or multi-span object 380) to peer OBPs (typically, the modeled object is sent to the next downstream OBP as identified by the configuration file 400).

The propagate state 250 also causes the OBP to send a BEOT to other modeled objects (those affected by the execution of the BMF) in the same node in which the OBP resides. In other words, executing 230 the BMF of one modeled object may generate BEOTs for other modeled objects maintained by the OBP of that node. Formally speaking, BMF1 can serve as the input (or event) to BMF2, BMF3 . . . BMFN. In this way, optical effects may be cascaded along the logical network of emulation processes.

When the propagate state 250 completes, the state machine 200 transitions to the neutral state 210. Of course, the BEOTs spawned by the execution state 230 and propagated by the propagate state 250 will trigger the corresponding state machines to transition from the neutral state 210 to the execution state 230.

Figure 11C:
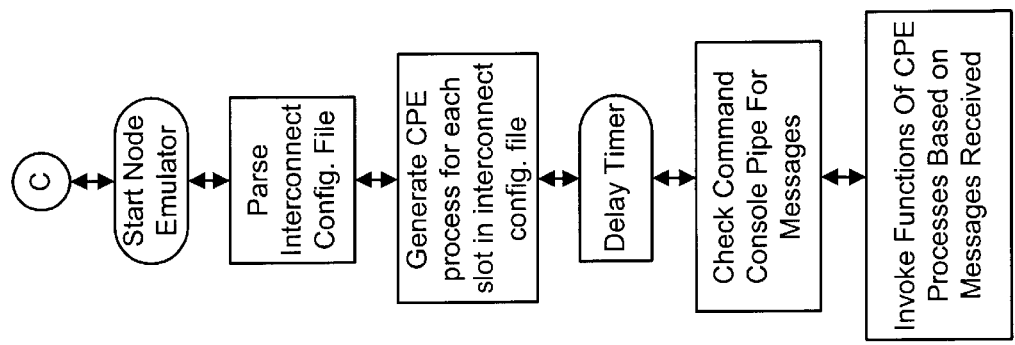
FIGS. 11a–c are high-level flowcharts illustrating the general processes performed by the inventive emulator to handle the configuration files, create processes for spans, nodes and circuit packs and to handle input commands.
Figure 11B:
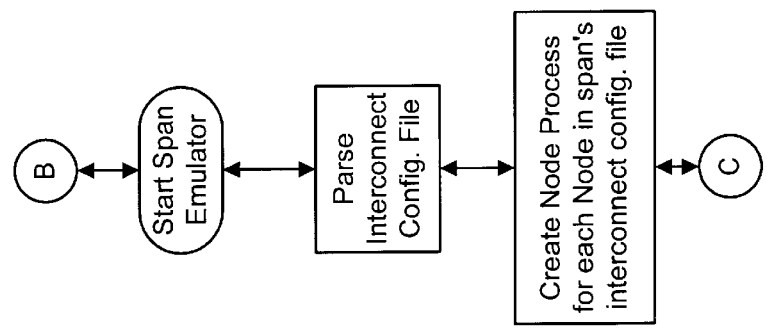
Figure 11A:
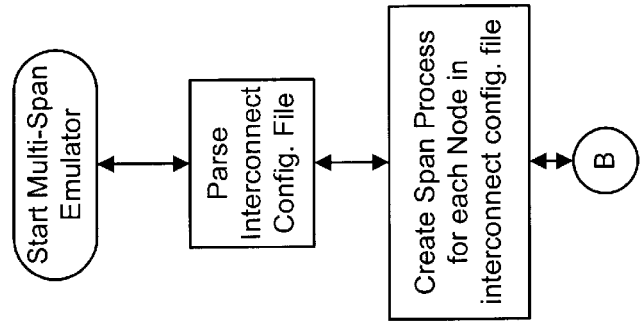

To set up the emulation processes, the flowcharts of FIGS. 11*a–c* may be utilized. FIG. 11*a* describes the process of setting up a multi-span emulator which essentially parses the interconnect configuration file (FIG. 10) and creates span processes (FIG. 6) for each node specified in the configuration file. For each such span process so created, the process of FIG. 11*b* is called which parses the interconnect configuration file (FIG. 10) and generates node processes (FIG. 6) for each node specified in that span's configuration file. In an iterative fashion, this parsing and generating process is repeated (FIG. 11*c*) for each CPE in each node process created by the FIG. 11*b* method.

Once the interconnect configuration file is fully parsed and the appropriate emulation processes generated, the optical emulation system 101 checks the command console 128, 138, 148 for messages. Based on the command messages so received (e.g. change attribute value) the invention invokes the functions of the corresponding state machine 200 (the changed attribute value triggers a BEOT and the transition of the state machine 200 from neutral state 210 to execution state 230 as discussed above).

Moreover, the modeled attribute values and the modeled objects themselves can be overridden in the emulator through console commands to explicitly set the value of an attribute or change a modeled object. In addition, a series of such overrides may be fed to the emulator with a script in order to simulate a particular hardware scenario, testing regime, etc.

EXAMPLE

The following example is presented to further illustrate the inventive concepts. For this example, assume that a basic WDM system is being emulated such as the one illustrated in FIG. 1a except that a single OLA 30-1 is provided between end terminals 20, 40. The optical interconnections of this basic system are specified in the interconnect configuration file. Using the methods of FIGS. 11a–c, each of the transmitters 20-1 to 20-n would be emulated by a CPE such that (n) transmitter EPs (emulation processes) 522 emulating transmitters would be included in the emulated west end node 120 (see FIG. 12). The WDM MUX 27 is simplified in this example as a combiner that is represented by another CPE (combiner EP 526) emulating an optical combiner.

Figure 12:
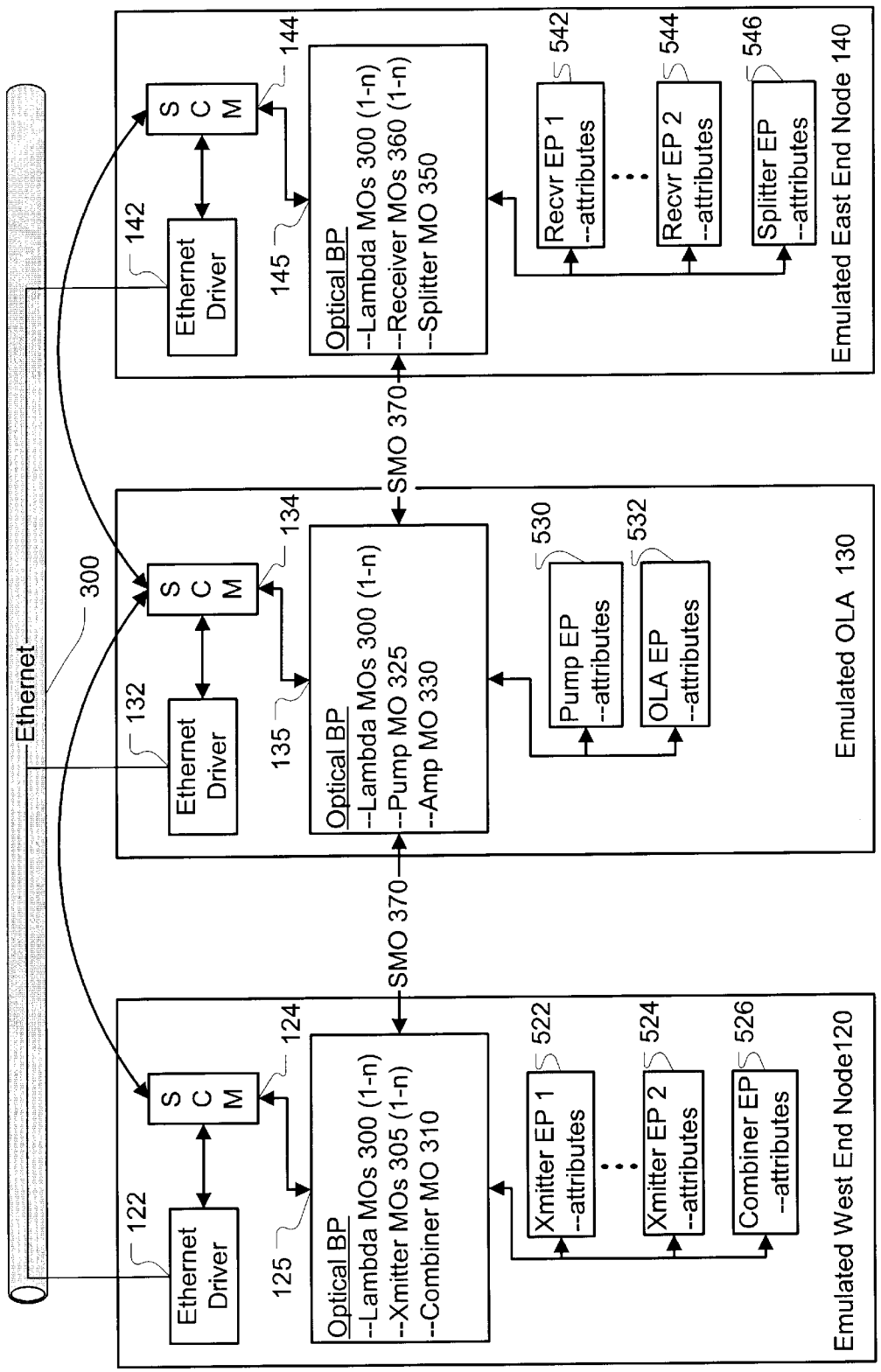
FIG. 12 is a mid-level block diagram illustrating components of the inventive emulator software, their arrangement within emulated nodes, and the communications topology for emulator components of a simplified single span optical communications system.

As further shown in FIG. 12, the OLA 30-1 (see FIG. 5) would be represented in the emulated OLA 130 with OLA EP 532 and Pump EP 530 performing the emulated optical amplification of the WDM signal. The east end terminal 40 would be represented as the emulated east end node 140 and would include a splitter EP 546 for the WDM DEMUX 40 (the splitter emulation process described above) and one CPE for each of the receivers 40-1 to 40-n (shown as receiver EPs 542, 544, etc).

FIG. 12 also shows the modeled objects maintained by each of the OBPs. Specifically, OBP 124 maintains a lambda modeled object 300 for each of the n possible wavelengths capable of being handled by the emulated west end node 120; transmitter modeled objects 305 (for each of the n transmitters); a combiner modeled object 310 and a router modeled object 320.

OBP 135 maintains a lambda modeled object 300 for each of the possible wavelengths capable of being handled by the emulated OLA 130; a pump modeled object 325 and an amp modeled object 330. OBP 145 maintains a lambda modeled object 300 for each of the possible wavelengths capable of being handled by the emulated east end node 140; a receiver modeled objects 360 (for each of the n receivers), and a splitter modeled object 350.

Once all of the emulation processes have been established, the span console process 160 may be used to instruct the transmitter emulators 522, 524 to begin transmitting a logical optical signal. This may be done by changing the transmitter power optical attribute to ON (the transmitters in this example output a fixed power level but they could output a variable power level and the object could track this variable power level). This changed attribute causes the transmitter emulator 522 (and 524) to send a BEOT to the OBP 124 thereby transitioning the OBP 125 into the execution state 230 whereupon the associated transmitter modeled object 305 is accessed to retrieve the transmitter BMF. The transmitter BMF is quite simple and simply causes the OBP 125 to pass on the lambda modeled object 300 associated with transmitter emulator 522. The OBP 125 then transitions to the propagate state 250 which passes on the lambda modeled object 330 by updating the lambda modeled object attribute in the combiner modeled object 310 (the number of such lambda modeled objects has increased by one and this attribute value may be updated). Since OBP 125 is done sending it transitions to neutral state 210. This process is repeated for each of the transmitter EPs commanded to turn ON.

Because the OBP 125 changed an attribute value (number of wavelengths being combined) in the combiner EP 526, the combiner EP 526 sends the OBP 125 a BEOT thereby causing OBP 125 to transition from the neutral state 210 to the execution state 230. The OBP 125 then executes 230 the combiner BMF in the associated combiner modeled object 310 that it maintains and calculates an output power level of the combiner based on the number of wavelengths being transmitted (or, output powers of the transmitters). As mentioned above, each wavelength in this example contributes −X dBm to the combiner output signal (assuming a constant power X from each transmitter feeder the combiner). The loss of Y dBm through the combiners is also included in this combiner BMF as follows.

CombOutputSignal=(#activeSignals*(−X dBm))−Y dBm.

The output signal power level attribute of the combiner modeled object 310 is then changed to reflect the results of this BMF calculation. The OBP 125 also propagates 250 the changed output power attribute to the combiner EP 526 but since the output power is a result and not an input value another BEOT to OBP 125 is not necessary or desired. In other words, changes to output power attributes are not considered a BEOT.

More importantly, the OBP 125 also updates and propagates 250 a span modeled object 370 (including the new output signal power and the updated wavelength modeled objects 300) to OBP 135. When OBP 135 receives the span modeled object 370 from OBP 125, it updates the lambda modeled objects 300 and the amp modeled object 330 (the input power field) maintained by OBP 135. The OBP also changes the input power attribute maintained by the OLA EP 532.

The OLA EP 532, upon updating of the changed input power attribute (the combiner output power value is now the amp input power), sends a BEOT to the OBP 135 which causes OBP 135 to transition from neutral state 210 to execution state 230. The OBP then executes the OLA BMF in the amp modeled object 330 that it maintains. The OLA BMF, in this case, utilizes the changed input power level (total input power PinT in the above equations) to calculate the amp output power level. The calculated output power level is used to change the output power attribute in the amp modeled object 300 and to change the output power attribute maintained by the OLA EP 532. Thereafter, the OBP 135 propagates 250 a span object 370 to OBP 145 in the emulated east end node 140.

The CPEs (e.g. transmitter EPs 522, 524, combiner EP 526, OLA EP 532, etc) also communicate information to the respective NCPs. This information includes the optical attributes (e.g. optical input and output powers, signal conditions, etc) stored in the various modeled objects and aids the NCPs in performing OAM&P, control algorithms, etc.

The modeled objects propagate in this fashion to the splitter and receiver emulation processes 546, 544. In this way, the normal operation of an optical network may be emulated and the NCPs may monitor and control the network as if it were physically present.

Likewise, an error in the emulated optical network may be propagated through the emulation processes in a cascaded fashion. For example, to emulate a pump failure the pump power level attribute in the pump modeled object 325 may be set to zero by a command entered through the span console process 160 and console 138. This change in an attribute flows to a changed attribute in the amp emulator 532 which transitions to the execution state 230. In this case, the amp emulator BMF will determine that the output power of the amp is zero. The BMF will also change the signal condition attribute to LOS (loss of signal) for each of the wavelength modeled objects 300 associated with the amp emulator. These attributes will then propagate to the splitter emulator and receiver emulators (and objects) thereby triggering calculations of output power levels at each stage. At the receiver emulators, the BI error count will also skyrocket due to the LOS. The NCPs monitoring these values may set off alarms and generally respond to the cascading errors in the emulated optical system 101.

Other events and error conditions may be emulated by appropriate commands sent via the span and multi-span console processes 160, 165. Such events and error conditions that affect the emulated optical signal will propagate through the emulated system 101 in much the same way as a hardware system. Other examples include a transmitter failure causing a LOS signal condition in the associated wavelength modeled object 300 and propagated effects downstream such as output power changes in the combiner, amps, splitter and receiver emulators.

Alternatives

Figure 13:
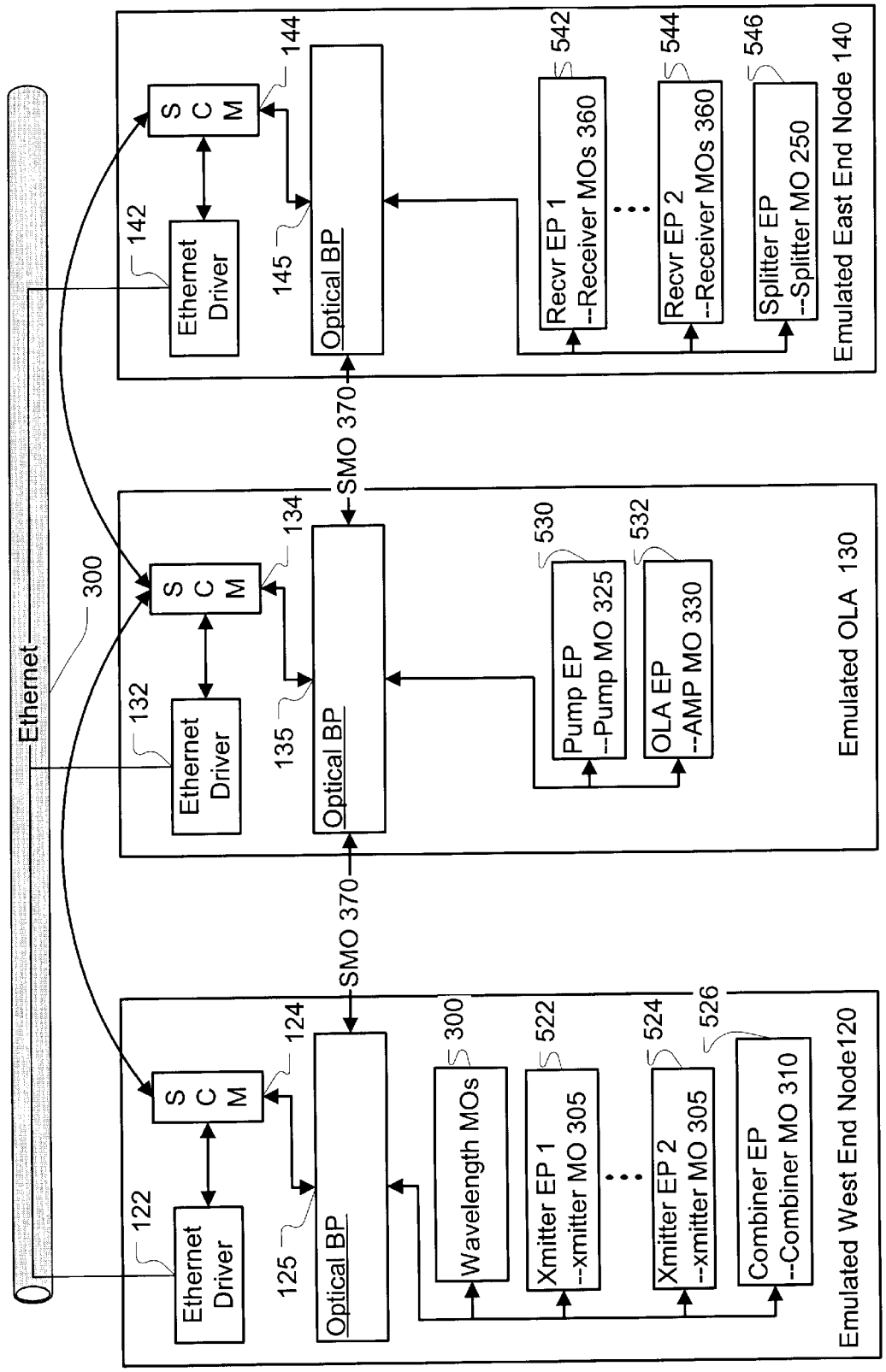
FIG. 13 is a mid-level block diagram illustrating components of a second embodiment of the inventive emulator software, their arrangement within emulated nodes, and the communications topology for emulator components of a simplified single span optical communications system.

The above sections describe a first embodiment in which the OBPs act as central coordinators that receive modeled objects, transmit modeled objects, execute the BMFs, and run the state machines. As an alternative, the CPEs may play these roles as illustrated in FIG. 13. More specifically, each of the process emulators (including the CPEs 126, 127, 136, 136, etc; the OBPs 125, 135, 145, etc; the console processes 160, 165, and the SCMs 124, 134, 144, etc) is an event-driven state machine. FIG. 9 outlines the states and events that drive each of the emulation processes and FIG. 13 shows a particular example of an emulated system 501 similar to the system 500 illustrated in FIG. 12 but with the second embodiment methodology for handling modeled objects and running the state machines 200.

In the second embodiment and as shown in FIG. 13, the CPEs maintain the modeled objects not the OBPs. For example, the combiner emulator process 526 maintains the combiner modeled object 310, the OLA emulator process 532 maintains the amp modeled object 330, and the receiver emulator processes 542, 544 maintain respective receiver modeled objects 360. Indeed, the location of the modeled objects and the emulation process responsible for maintaining the modeled objects may vary. The first embodiment described above is generally preferred since it is easier for a software developer to update and maintain modeled objects and BMFs that are centralized in the OBP as opposed to being distributed throughout the various CPEs. The second embodiment may be preferred because it runs faster than the first embodiment due to parallel running of state machines and removal of the OBP state machine bottleneck.

In the second embodiment, a modeled object or attribute from one CPE propagates to the next downstream CPE and the receipt of that modeled object by the downstream CPE is a BEOT that transitions the downstream CPE into the execution state 230. The execution state 230 of the emulated process executes the BMF (behavior modeling function) of the modeled object. For example, the transmitter EPs 522, 524 propagate the transmitter modeled objects 305 to the combiner emulation process 526.

Upon completion of the execution state 230, the optical modeling state machine running in the CPE transitions to a propagate state 250 in which modeled objects are sent to other CPEs and/or to peer OBPs (e.g. the optical backplane emulator process 125 propagates a span modeled object 370 to optical backplane emulator process 135). The propagate state 250 propagates changed modeled objects from emulation process to emulation process according to the logical interconnections (identification of sources and sinks) in the configuration file (FIG. 10). In this way, optical effects may be cascaded along the logical network of emulation processes.

The invention is not limited to emulating the simplified WDM system 1 shown in FIG. 1a. The concepts of the invention may be applied to any optical communications system which may have a variety of different configurations, elements and functionalities than those illustrated above such a single wavelength (non-WDM) optical communication systems, different span and node topologies, different optical behaviors, etc. Behavior modeling functions and modeling objects may be developed for different types of circuit packs that may exist in such systems using the teachings above in order to adapt the invention to different optical communications systems.

As one illustrative example, the end terminals 20, 40 may include optical amplifiers (e.g. the west terminal 20 may include an output optical amplifier that amplifies the output of the WDM MUX 27 and the east terminal 40 may include an input optical amplifier that receives the signal from OLA 30-3). By adding an amp emulation process and an amp modeled object 300 to the emulated end nodes 120, 140 the invention would be able to emulate such a system. Such additions are easily made by updating the configuration file 400 which is parsed by the workstation 10 to set up the emulated system.

The invention being thus described, it will be obvious that the same may be varied in many ways. Such variations are not to be regarded as departure from the spirit and scope of the invention, and all such modifications as would be obvious to one skilled in the art are intended to be included within the scope of the following claims.

What is claimed is:

1. A method of emulating the optical behavior of an optical communications system having a plurality of optical communications modules, comprising:

generating a wavelength modeled object modeling at least a signal condition of an optical signal;

generating a modeled object for each of the optical communications modules and including at least an optical power level field and a behavior modeling function modeling the optical behavior of the corresponding optical communications module;

propagating the wavelength modeled object along a logical path of emulated optical communications modules;

executing the behavior modeling function of the modeled object associated with the emulated optical communications module receiving the propagated wavelength modeled object; and storing the results of said executing in the associated modeled object.

2. The method of emulating the optical behavior of an optical communications system according to claim 1, wherein the optical communications system includes a plurality of nodes;

wherein the modeled objects are organized into a plurality of nodes emulating the nodes of the optical communications system;

said propagating step propagating a span modeled object between nodes, the span modeled object including the propagated wavelength modeled object.

3. The method of emulating the optical behavior of an optical communications system according to claim 1, wherein the optical communications system includes a plurality of spans, each span having a plurality of nodes;

wherein the modeled objects are organized into a plurality of spans and nodes emulating the spans and nodes of the optical communications system;

said propagating step propagating a multi-span modeled object between spans, the multi-span modeled object including the propagated wavelength modeled object.

4. The method of emulating the optical behavior of an optical communications system according to claim 1, wherein the optical communications system being emulated is a wavelength division multiplexed system transmitting a plurality of optical signals at respective wavelengths, the method further comprising:

generating a plurality of wavelength modeled objects modeling at least the signal conditions and wavelengths of the optical signals; and propagating the wavelength modeled objects along a logical path of emulated optical communications modules.

5. The method of emulating the optical behavior of an optical communications system according to claim 4, wherein the optical communications system being emulated includes an optical combiner combining at least some of the plurality of optical signals, the method further comprising:

generating a combiner modeled object including an output signal power level field, the plurality of propagated wavelength modeled objects, and a combiner behavior modeling function modeling the optical behavior of an optical wavelength combiner;

executing the combiner behavior modeling function and storing the results thereof in the combiner modeled object; and propagating the combiner modeled object to a next emulated optical communications module along the logical path of emulated optical communications modules.

6. The method of emulating the optical behavior of an optical communications system according to claim 4, wherein the wavelength modeled objects further include a data rate field.

7. The method of emulating the optical behavior of an optical communications system according to claim 4, wherein the wavelength modeled objects further include an error count field.

8. The method of emulating the optical behavior of an optical communications system according to claim 4, wherein the signal conditions of the wavelength modeled objects include Loss Of Signal, Loss Of Framing, Loss Of Modulation, and Signal OK fields.

9. The method of emulating the optical behavior of an optical communications system according to claim 4, wherein the optical communications system includes a optical amplifier, the method further comprising:

generating an amplifier modeled object including an output signal power level field, an input power level field, pump power level field, the plurality of propagated wavelength modeled objects, and an amplifier behavior modeling function modeling the optical behavior of the optical amplifier;

executing the amplifier behavior modeling function and storing the results thereof in the amplifier modeled object.

10. The method of emulating the optical behavior of an optical communications system according to claim 9, said executing the amplifier behavior modeling function including overriding the signal conditions in the propagated wavelength modeled objects to Loss Of Signal if the value of the input power level field is less than a first threshold value or if the value of pump power level field is less than a second threshold value.

11. The method of emulating the optical behavior of an optical communications system according to claim 9, said executing the amplifier behavior modeling function including overriding the signal conditions in the propagated wavelength modeled objects to loss of frame if more than one transmitter modeled object has the same wavelength value.

12. The method of emulating the optical behavior of an optical communications system according to claim 4, wherein the optical communications system being emulated includes a splitter and a plurality of optical receivers, the method further comprising:

generating a splitter modeled object including an output signal power level field, the plurality of propagated wavelength modeled objects, and a splitter behavior modeling function modeling the optical behavior of an optical splitter;

generating a plurality of receiver modeled objects including an input signal power level field, a wavelength field, a signal condition field, one of the plurality of propagated wavelength modeled objects, and a receiver behavior modeling function modeling the optical behavior of an optical receiver;

executing the receiver behavior modeling function and storing the results thereof in the receiver modeled object.

13. The method of emulating the optical behavior of an optical communications system according to claim 12, wherein the wavelength modeled objects further include a data rate field, said executing the receiver behavior modeling function including overriding the signal condition in the receiver modeled object to loss of frame based on a determination of whether the data rate field of the propagated wavelength modeled object matches the data rate field of the receiver modeled object.

14. The method of emulating the optical behavior of an optical communications system according to claim 12, said executing the receiver behavior modeling function including overriding the signal condition to Loss Of Signal in the receiver modeled object based on a determination of whether the signal condition field of the propagated wavelength modeled object indicates a signal unknown condition.

15. The method of emulating the optical behavior of an optical communications system according to claim 12, said executing the receiver behavior modeling function including setting the input signal power level in the receiver modeled object to zero if the signal condition field of the propagated wavelength modeled object indicates a loss of signal condition.

16. The method of emulating the optical behavior of an optical communications system according to claim 1, wherein the next emulated optical communications module along the logical path is a optical backplane emulator and said execution step is performed by the optical backplane emulator, the method further comprising:

maintaining optical attributes at each of the emulated optical communications modules;

updating at least one of the optical attributes when said executing step results in a change to a corresponding optical attribute field in the modeled object associated with said executing step.

17. The method of emulating the optical behavior of an optical communications system according to claim 1, wherein said execution step is performed by the emulated optical communications modules.

18. The method of emulating the optical behavior of an optical communications system according to claim 1, further comprising:

parsing an interconnect configuration file storing configurations of and logical interconnections between the emulated optical communications modules, said generating step generating a modeled object for each of the emulated optical communications modules parsed in said parsing step.

19. The method of emulating the optical behavior of an optical communications system according to claim 1, further comprising:

commanding a change in at least one of the modeled objects;

executing the behavior modeling function in the modeled object changed by said commanding step; and storing the results of said executing in the associated modeled object.

20. A software emulation method for emulating the optical behavior of a system of optical communications elements of an optical communications system wherein the system includes hardware node elements and at least some of the hardware node elements include a nodal control processor and a bus, the method comprising:

maintaining modeled objects for each of the optical communications elements being emulated wherein each of the modeled objects includes a behavior modeling function modeling the optical behavior of the corresponding optical communications element;

receiving a first behavior event object trigger associated with a first emulated optical communications element;

executing the behavior modeling function of the modeled object associated with the first behavior event object trigger; and updating the modeled object affected by the execution of the first behavior modeling function.

21. The software emulation method for emulating the optical behavior of a system of optical communications elements according to claim 20, further comprising:

generating the first behavior event object trigger when at least one of the modeled objects has been received by the first emulated optical communications element.

22. The software emulation method for emulating the optical behavior of a system of optical communications elements according to claim 20, further comprising:

maintaining optical attributes of the emulated optical communications elements;

changing at least one of the maintained optical attributes of the emulated optical communications element affected by the execution of the first behavior modeling function; and sending a second behavior object trigger to the emulated optical communications element associated with the optical attributes changed by said changing step.

23. The software emulation method for emulating the optical behavior of a system of optical communications elements according to claim 20, further comprising:

executing the behavior modeling function of each modeled object affected by the first behavior event object trigger; and updating the modeled objects affected by the execution of the behavior modeling functions executed by said executing step.

* * * * *